US012440002B2

(12) United States Patent
Thompsett et al.

(10) Patent No.: US 12,440,002 B2
(45) Date of Patent: Oct. 14, 2025

(54) OUTSOLE FOR A SHOE

(71) Applicant: adidas AG, Herzogenaurach (DE)

(72) Inventors: Benjamin Alexander Thompsett, Nuremberg (DE); Arnau Sanjuan Roman, Brooklyn, NY (US); Harry Miles, Nuremberg (DE); Baptiste Jacques Dany Tarenne, Fuerth (DE); Strahinja Spasic, Los Angeles, CA (US); Daniel Ruiz, Erlangen (DE); Tobias Biegel, Großhabersdorf (DE); Robert Stinchcomb, Chestertown, NY (US); Stefan Schneider, Dietenhofen (DE); Mareike Engel, Seukendorf (DE); Hannes Schaefke, Fuerth (DE); Jürgen Weidl, Aurachtal (DE)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 18/496,511

(22) Filed: Oct. 27, 2023

(65) Prior Publication Data

US 2024/0057724 A1 Feb. 22, 2024

Related U.S. Application Data

(63) Continuation-in-part of application No. 18/154,397, filed on Jan. 13, 2023, which is a continuation-in-part
(Continued)

(30) Foreign Application Priority Data

Apr. 28, 2023 (EP) .................................... 23170619

(51) Int. Cl.
*A43B 5/02* (2006.01)
*A43B 5/06* (2022.01)
(Continued)

(52) U.S. Cl.
CPC .............. *A43C 15/162* (2013.01); *A43B 5/02* (2013.01); *A43B 5/06* (2013.01); *A43B 13/18* (2013.01);
(Continued)

(58) Field of Classification Search
CPC ......... A43B 13/18; A43B 13/188; A43B 5/02; A43B 5/06; A43C 15/168
(Continued)

(56) References Cited

U.S. PATENT DOCUMENTS 4,316,335 A 2/1982 Giese et al.
4,754,561 A * 7/1988 Dufour ................ A43B 13/188 36/31
(Continued)

FOREIGN PATENT DOCUMENTS

DE 20 2017 007 514 U1 3/2022
EP 2 074 901 A1 7/2009
(Continued)

*Primary Examiner* — Marie D Bays
(74) *Attorney, Agent, or Firm* — Sterne, Kessler, Goldstein & Fox P.L.L.C.

(57) ABSTRACT

An outsole for a shoe including first and second sole segments that overlap at least partially. The first sole segment can include at least one stud and be arranged at least in a mid-foot portion of the outsole. The second sole segment can include at least one stud and be arranged at least in a toe portion of the outsole. In some embodiments, the outsole can include a first cushion element arranged between the first sole segment and the second sole segment and overlapping with at least one first stud of the first or second sole segment. In some embodiments, the outsole can include a second cushion element being arranged between the first sole segment and the second sole segment and overlapping
(Continued)

with at least one second stud of the first or second sole segment. In some embodiments, the outsole may be an outsole for a football shoe.

19 Claims, 16 Drawing Sheets

Related U.S. Application Data of application No. 17/733,229, filed on Apr. 29, 2022, now Pat. No. 11,576,466.

(51) Int. Cl.

| | |
|---|---|
| ***A43B 13/18*** | (2006.01) |
| ***A43C 15/16*** | (2006.01) |
| ***B29D 35/00*** | (2010.01) |
| ***B29D 35/14*** | (2010.01) |

(52) U.S. Cl.
CPC .......... *A43C 15/161* (2013.01); *A43C 15/168* (2013.01); *B29D 35/0009* (2013.01); *B29D 35/142* (2013.01)

(58) Field of Classification Search
USPC .............................................................. 36/28
See application file for complete search history.

(56) References Cited

U.S. PATENT DOCUMENTS

| | | | | | |
|---|---|---|---|---|---|
| 5,077,916 | A | | 1/1992 | Beneteau | |
| 5,325,611 | A | | 7/1994 | Dyer et al. | |
| 5,561,920 | A | * | 10/1996 | Graham | A43B 1/0072 36/7.8 |
| 5,718,063 | A | | 2/1998 | Yamashita et al. | |
| 5,983,529 | A | | 11/1999 | Serna | |
| 6,038,790 | A | * | 3/2000 | Pyle | A43B 7/144 36/28 |
| 6,421,933 | B1 | | 7/2002 | Zamprogno | |
| 7,918,041 | B2 | | 4/2011 | Cho | |
| 8,316,560 | B2 | | 11/2012 | Caron et al. | |
| 9,591,891 | B1 | * | 3/2017 | Baucom | A43B 13/122 |
| 11,058,174 | B2 | | 7/2021 | Hale | |
| 11,576,466 | B1 | * | 2/2023 | Thompsett | A43B 5/06 |
| 2005/0016029 | A1 | | 1/2005 | Auger et al. | |
| 2013/0318831 | A1 | * | 12/2013 | Foxen | A43B 13/223 12/146 B |
| 2013/0333248 | A1 | * | 12/2013 | Auger | A43B 3/0052 36/134 |
| 2014/0026444 | A1 | | 1/2014 | Howley et al. | |
| 2014/0366402 | A1 | * | 12/2014 | Cavaliere | A43C 15/161 12/146 B |
| 2015/0181974 | A1 | | 7/2015 | Davis et al. | |
| 2016/0183633 | A1 | * | 6/2016 | Scofield | A43B 13/20 36/29 |
| 2016/0295959 | A1 | | 10/2016 | Dyer et al. | |
| 2018/0213886 | A1 | * | 8/2018 | Connell | A43B 13/141 |
| 2019/0014866 | A1 | | 1/2019 | Schiller et al. | |
| 2019/0246738 | A1 | * | 8/2019 | Connell | A43B 13/186 |
| 2019/0373981 | A1 | * | 12/2019 | Luh | A43B 13/026 |
| 2020/0154831 | A1 | * | 5/2020 | Hopkins | A43B 13/22 |
| 2021/0030112 | A1 | * | 2/2021 | Amoako | A43B 13/20 |
| 2021/0052037 | A1 | * | 2/2021 | Greenspan | A43B 13/127 |
| 2021/0085021 | A1 | | 3/2021 | Bardini | |
| 2021/0085024 | A1 | | 3/2021 | Chen et al. | |
| 2021/0330027 | A1 | | 10/2021 | Brueggemann et al. | |
| 2022/0022597 | A1 | | 1/2022 | Bowman et al. | |
| 2022/0225729 | A1 | * | 7/2022 | Bonin | A43B 13/186 |
| 2023/0142549 | A1 | | 5/2023 | Dunning | |
| 2023/0284750 | A1 | | 9/2023 | Thompsett et al. | |

FOREIGN PATENT DOCUMENTS

| | | | |
|---|---|---|---|
| JP | 02-50203 | U | 4/1990 |
| JP | 2000-041703 | A | 2/2000 |
| JP | 2010-017233 | A | 1/2010 |

* cited by examiner

OUTSOLE FOR A SHOE

CROSS-REFERENCE TO RELATED APPLICATION

This application is a continuation-in-part of and claims priority to U.S. application Ser. No. 18/154,397, filed Jan. 13, 2023, which is a continuation-in-part of U.S. application Ser. No. 17/733,229, filed Apr. 29, 2022. Each of these applications is incorporated by reference in its entirety.

This application claims priority to European Patent Application No. 23170619.3, filed on Apr. 28, 2023, which is hereby incorporated by reference in its entirety.

TECHNICAL FIELD

The present disclosure relates to an outsole for a shoe, in particular a football shoe, a shoe comprising said outsole, and a method for the manufacturing of an outsole.

BACKGROUND

When designing outsoles for shoes and/or shoes, a compromise is often made between different properties that the outsole and/or the shoe should have. Exemplarily, a football shoe with a stiff outsole can provide outstanding properties for running with high speed, whereas the stiff outsole may however result in a reduced comfort. Hence, there is a continuing need for shoes designed to improve the overall properties of the outsole and/or the shoe.

BRIEF SUMMARY

The present disclosure is directed to an outsole for a shoe, for example a football shoe, comprising a first sole segment that overlaps a second sole segment. One or more cushion elements may be provided between the first sole element and the second sole segment in an area where the first and second sole segments overlap. The configuration of overlapping sole segments and/or cushion elements can provide the various advantageous effects described herein.

A first embodiment (I) of the present disclosure is directed to an outsole (1) for a shoe (50) the outsole (1) comprising a first sole segment (2) which comprises at least one stud (6*a*, 6*b*, 7*a*, 7*b*) and is arranged at least in a mid-foot portion (25) of the outsole (1); a second sole segment (3) which comprises at least one stud and is arranged at least in a toe portion (20) of the outsole (1), wherein the first sole segment (2) and the second sole segment (3) overlap partially; a first cushion element (4) being arranged between the first sole segment (2) and the second sole segment (3), wherein the first cushion element (4) overlaps with at least one first stud (6*a*, 6*b*) of the first or second sole segment (2, 3); and a second cushion element (5) being arranged between the first sole segment (2) and the second sole segment (3), wherein the second cushion element (5) overlaps with at least one second stud (7*a*, 7*b*) of the first or second sole segment (2, 3). In a particular embodiment, the first embodiment is directed to an outsole for a football shoe.

In a second embodiment (II), the first sole segment (2) and/or the second sole segment (3) according to the first embodiment (I) comprise at least one aperture (8*a*, 8*b*, 8*c*, 9*a*, 9*b*, 9*c*) which overlaps at least partially with the first cushion element (4) or the second cushion element (5).

In a third embodiment (III), the at least one aperture (8*a*, 8*b*, 8*c*, 9*a*, 9*b*, 9*c*) according to the second embodiment (II) comprises at least one bottom aperture (8*b*, 9*b*) which is adapted such that the first cushion element (4) and/or the second cushion element (5) is exposed towards a surface on which the outsole (i) is to be placed during normal use.

In a fourth embodiment (IV), the at least one aperture (8*a*, 8*b*, 8*c*, 9*a*, 9*b*, 9*c*) according to the second embodiment (II) or the third embodiment (III) comprises at least one side aperture (8*a*, 8*c*, 9*a*, 9*c*) which is adapted such that the first cushion element (4) and/or the second cushion element (5) is exposed in a lateral direction of the outsole (i) or a medial direction of the outsole (i).

In a fifth embodiment (V), the at least one aperture (8*a*, 8*b*, 8*c*, 9*a*, 9*b*, 9*c*) according to any one of embodiments (II)-(IV) comprises at least one first aperture (8*a*, 8*b*, 8*c*) which overlaps at least partially with the first cushion element (4).

In a sixth embodiment (VI), the at least one aperture (8*a*, 8*b*, 8*c*, 9*a*, 9*b*, 9*c*) according to any one of embodiments (II)-(V) comprises at least one second aperture (9*a*, 9*b*, 9*c*) which overlaps at least partially with the second cushion element (5).

In a seventh embodiment (VII), the first cushion element (4) and/or the second cushion element (5) according to any one of embodiments (I)-(VI) as seen (100) from a heel portion (30) of the outsole (i) do not extend substantially beyond an area of the outsole (i) which is configured to support Metatarsal fat pads. In a preferred embodiment, the first cushion element (4) and/or the second cushion element (5) according to any one of embodiments (I)-(VI) as seen (boo) from a heel portion (30) of the outsole (i) do not extend beyond an area of the outsole (i) which is configured to support Metatarsal fat pads.

In an eighth embodiment (VIII), the first sole segment (2) according to the seventh embodiment (VII) as seen (100) from the heel portion (30) extends beyond the area of the outsole (i) which is configured to support Metatarsal fat pads in a direction towards the toe portion (20) with a reduced cross-section relative to a cross-section in an area where the first sole segment (2) overlaps with the first cushion element (4) and/or the second cushion element (5).

In a ninth embodiment (IX), the at least one first stud (6*a*, 6*b*) and the at least one second stud (7*a*, 7*b*) according to any one of embodiments (I)-(VIII) are attached to the first sole segment (2).

In a tenth embodiment (X), the first cushion element (4) and/or the second cushion element (5) according to any one of embodiments (I)-(IX) comprise a thickness in the range from 1 mm to 10 mm, preferably from 2 mm to 6 mm.

In an eleventh embodiment (XI), the first cushion element (4) according to any one of embodiments (I)-(X) overlaps with two first studs (6*a*, 6*b*) and/or the second cushion element (5) according to any one of embodiments (I)-(X) overlaps with two second studs (7*a*, 7*b*). In a preferred embodiment, the first cushion element (4) according to any one of embodiments (I)-(X) overlaps with exactly two first studs (6*a*, 6*b*) and/or the second cushion element (5) according to any one of embodiments (I)-(X) overlaps with exactly two second studs (7*a*, 7*b*). In a preferred embodiment, the at least one bottom aperture (8*b*, 9*b*) according to the third embodiment (III) extends at least partially between the two first studs (6*a*, 6*b*) or between the two second studs (7*a*, 7*b*).

In a twelfth embodiment (XII), the first cushion element (4) according to any one of embodiments (I)-(XI) is arranged on a medial part of the outsole (i) and the second cushion element (5) according to any one of embodiments (I)-(XI) is arranged on a lateral part of the outsole (i), wherein a minimal distance between the first cushion element (4) and the second cushion element (5) lies in the range from 3 mm to 20 mm. In a preferred embodiment, the minimal distance between the first cushion element (4) and the second cushion element (5) lies in the range from 5 mm to 15 mm.

In a thirteenth embodiment (XIII), the first cushion element (4) and/or the second cushion element (5) according to any one of embodiments (I)-(XII) are at least partially arranged in the mid-foot portion (25). In a preferred embodiment, the first sole segment (2) and the second sole segment (3) of the thirteenth embodiment (XIII) overlap in the mid-foot portion (25). In further preferred embodiment, the first sole segment (2) and the second sole segment (3) of the thirteenth embodiment (XIII) overlap in the toe portion (20).

In a fourteenth embodiment (XIV), the first cushion element (4) and/or the second cushion element (5) according to any one of embodiments (I)-(XIII) comprise a foam material.

In a fifteenth embodiment (XV), the first cushion element (4) and/or the second cushion element (5) according to any one of embodiments (I)-(XIV) comprise a 3D-printed component. In a preferred embodiment, the 3D-printed component is a 3D-printed lattice structure.

In a sixtieth embodiment (XVI), the first cushion element (4) and/or the second cushion element (5) according to any one of embodiments (I)-(XV) comprise a material which has a strain rate dependent material behaviour.

In a seventieth embodiment (VXII), the first cushion element (4) and/or the second cushion element (5) according to any one of embodiments (I)-(XVI) extend along 10% to 80% of a length of the outsole (i). In preferred embodiment, the first cushion element (4) and/or the second cushion element (5) according to any one of embodiments (I)-(XVI) extend along 15% to 70% of a length of the outsole (i). In a more preferred embodiment, the first cushion element (4) and/or the second cushion element (5) according to any one of embodiments (I)-(XVI) extend along 20% to 60% of a length of the outsole (i). In an even more preferred embodiment, the first cushion element (4) and/or the second cushion element (5) according to any one of embodiments (I)-(XVI) extend along 25% to 50% of a length of the outsole (i). In a most preferred embodiment, the first cushion element (4) and/or the second cushion element (5) according to any one of embodiments (I)-(XVI) extend along 30% to 40% of a length of the outsole (i).

In a eighteenth embodiment (XVIII), a distance between a rearmost point of the outsole (i) and a rearmost point of the first cushion element (4) and/or the second cushion element (5) according to any one of embodiments (I)-(XVII) is between 30% to 60% of the length of the outsole (i). In a preferred embodiment, a distance between a rearmost point of the outsole (i) and a rearmost point of the first cushion element (4) and/or the second cushion element (5) according to any one of embodiments (I)-(XVII) is between 35% to 55% of the length of the outsole (i). In a more preferred embodiment, a distance between a rearmost point of the outsole (i) and a rearmost point of the first cushion element (4) and/or the second cushion element (5) according to any one of embodiments (I)-(XVII) is between 40% to 50% of the length of the outsole (i).

In ninetieth embodiment (XIX), first sole segment (2) according to any one of embodiments (I)-(XVIII) is branched in a direction to the toe portion (20) of the outsole (i) into at least two branches (10, 15), wherein each of the two branches at least partially overlaps with the second sole segment (3), wherein a first branch (10) comprises the at least one first stud (6*a*, 6*b*) and at least partially houses the first cushion element (4), and wherein a second branch (15) comprises the at least one second stud (7*a*, 7*b*) and at least partially houses the second cushion element (5), wherein the first branch (10) extends along the medial part of the outsole (i) and the second branch (15) extends along the lateral part of the outsole (i).

In a twentieth embodiment (XX), the first branch (10) according to embodiments (V) and (XIX) comprises the at least one first aperture (8*a*, 8*b*, 8*c*), wherein the at least one first aperture (8*a*, 8*b*, 8*c*) comprises a lateral side aperture (8*c*) being directed to the lateral part of the outsole (i), such that the first cushion element (4) is exposed towards the second branch (15).

In a twenty-first embodiment (XXI), the second branch (15) according to the sixth embodiment (VI) and one of the nineteenth embodiment (XIX) or the twentieth embodiment (XX) comprises the at least one second aperture (9*a*, 9*b*, 9*c*), wherein the at least one second aperture (9*a*, 9*b*, 9*c*) comprises a medial side aperture (9*c*) directed to the medial part of the outsole (i), such that the second cushion element (5) is exposed towards the first branch (10).

In a twenty-second embodiment (XXII), the first branch (10) according to the fifth embodiment (V) and any one of embodiments (XIX)-(XXI) comprises the at least one first aperture (8*a*, 8*b*, 8*c*), wherein the at least one first aperture (8*a*, 8*b*, 8*c*) comprises a first bottom aperture (8*b*) such that the first cushion element (4) is exposed towards a surface on which the outsole (i) is to be placed during normal use.

In a twenty-third embodiment (XXIII), the second branch (15) according to the sixth embodiment (VI) and any one of embodiments (XIX)-(XXII) comprises the at least one second aperture (9*a*, 9*b*, 9*c*), wherein the at least one second aperture (9*a*, 9*b*, 9*c*) comprises a second bottom aperture (9*b*) such that the second cushion element (5) is exposed towards a surface on which the outsole (i) is to be placed during normal use.

In a twenty-fourth embodiment (XXIV), the first branch (10) according to the fifth embodiment (V) and any one of embodiments (XIX)-(XXIII) comprises the at least one first aperture (8*a*, 8*b*, 8*c*), wherein the at least one first aperture (8*a*, 8*b*, 8*c*) comprises a medial side aperture (8*a*) such that the first cushion element (4) is exposed medially outward from the outsole (i).

In a twenty-fifth embodiment (XXV), the second branch (15) according to the sixth embodiment (VI) and any one of embodiments (XIX)-(XXIV) comprises the at least one second aperture (9*a*, 9*b*, 9*c*), wherein the at least one second aperture (9*a*, 9*b*, 9*c*) comprises a lateral side aperture (9*a*) such that the second cushion element (5) is exposed outward from the outsole (i) in a lateral direction.

In a twenty-sixth embodiment (XVI), the first branch (10) according to any one of embodiments (XIX)-(XXV) bridges the first cushion element (4) in a longitudinal direction of the outsole (i) and is attached to the second sole segment (3) at least before bridging the first cushion element (4) and after bridging the first cushion element (4) and/or wherein the second branch (15) according to any one of embodiments (XIX)-(XXV) bridges the second cushion element (5) in a longitudinal direction of the outsole (i) and is attached to the second sole segment (3) at least before bridging the second cushion element (5) and after bridging the second cushion element (5). In a preferred embodiment, the first branch (10) according to the twenty-sixth embodiment (XXVI) terminates in a stud (40) which is attached to the first sole segment (2), and the second branch (15) according to the twenty-sixth embodiment (XXVI) terminates in a stud (45) which is attached to the first sole segment (2).

In a twenty-seventh embodiment (XXVII), a cross-section of the first branch (10) and/or the second branch (15) according to any one of embodiments (XIX)-(XXVI) is reduced after bridging the first cushion element (4) and/or the second cushion element (5) as seen from the heel portion (30) of the outsole (i).

In a twenty-eighth embodiment (XXVIII), the outsole (i) according to one of embodiments (I)-(XXVII) comprises at least one reinforcement element (60) that overlap with the first sole segment (2) and/or the second sole segment (3), In a preferred embodiment, the at least one reinforcement element (60) according to the twenty-eighth embodiment (XXVIII) overlaps with the first cushion element (4) and/or the second cushion element (5).

In a twenty-ninth embodiment (XXIX), the first sole segment (2) and/or the second sole segment (3) according to any one of embodiments (I)-(XXVIII) do not extend along a full length of the outsole (1).

A thirtieth embodiment (XXX) of the present disclosure is directed to a shoe (50) comprising a shoe upper (55) and an outsole (1) according to one of embodiments (I)-(XXIX).

A thirty-first embodiment (XXXI) of the present disclosure is directed to a method (woo) for the manufacturing of an outsole (1), the method (moo) comprising the following steps: (a) manufacturing (low) a first sole segment (2); (b) placing (1020) a first placeholder onto a medial part of the first sole segment (2) and placing a second placeholder onto a lateral part of the first sole segment (2); injection moulding (1030) a second sole segment (3), such that the first sole segment (2) and the second sole segment (3) are at least partially connected and such that the first placeholder and the second placeholder are each at least partially located between the first sole segment (2) and the second sole segment (3); removing (1040) the first placeholder and the second placeholder, and (e) arranging (1050) a first cushion element (4) and a second cushion element (5) between the first sole segment (2) and the second sole segment (3), wherein the position of the first cushion element (4) at least partially corresponds to the position where the first placeholder was placed, and wherein the position of the second cushion element (5) at least partially corresponds to the position where the second placeholder was placed. In particular embodiments, the method according to the thirty-first embodiment (XXXI) is directed to manufacturing an outsole (1) according to any one of embodiments (I)-(XXIX).

In a thirty-second embodiment (XXXII), the method (woo) according to the thirty-first embodiment (XXXI) is provided and, at least after step (c), the second sole segment (3) comprises a fixed portion (80*c*) which is two-dimensionally connected to the first sole segment (2), and at least one movable portion (80*a*, 80*b*) which is movable relative to the first sole segment (2) such that a distance between the at least one movable portion (80*a*, 80*b*) and the first sole segment (2) can be changed, wherein the at least one movable portion (80*a*, 80*b*) at least partially overlaps with the first placeholder and/or the second placeholder.

In a thirty-third embodiment (XXXIII), the method (moo) according to the thirty-second embodiment (XXXII) is provided and the at least one movable portion (80*a*, 80*b*) comprises a first movable portion (80*a*) overlapping with the first placeholder, and a second movable portion (80*b*) overlapping with the second placeholder.

In a thirty-fourth embodiment (XXXIV), the method (moo) according to the thirty-second embodiment (XXXII) or the thirty-third embodiment (XXXIII) is provided and removing (1040) the first placeholder and the second placeholder and/or arranging (1050) the first cushion element (4) and the second cushion element (5) between the first sole segment (2) and the second sole segment (3) comprises changing the distance between the at least one movable portion (80*a*, 80*b*) and the first sole segment (2).

In a thirty-fifth embodiment (XXXV), the method (moo) according to any one of embodiments (XXXII)-(XXXIV) is provided and the fixed portion (80*c*) is at least arranged in a toe portion (20) of the outsole (1) and a mid-foot portion (25) of the outsole (1).

BRIEF DESCRIPTION OF THE FIGURES

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These FIGS. are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
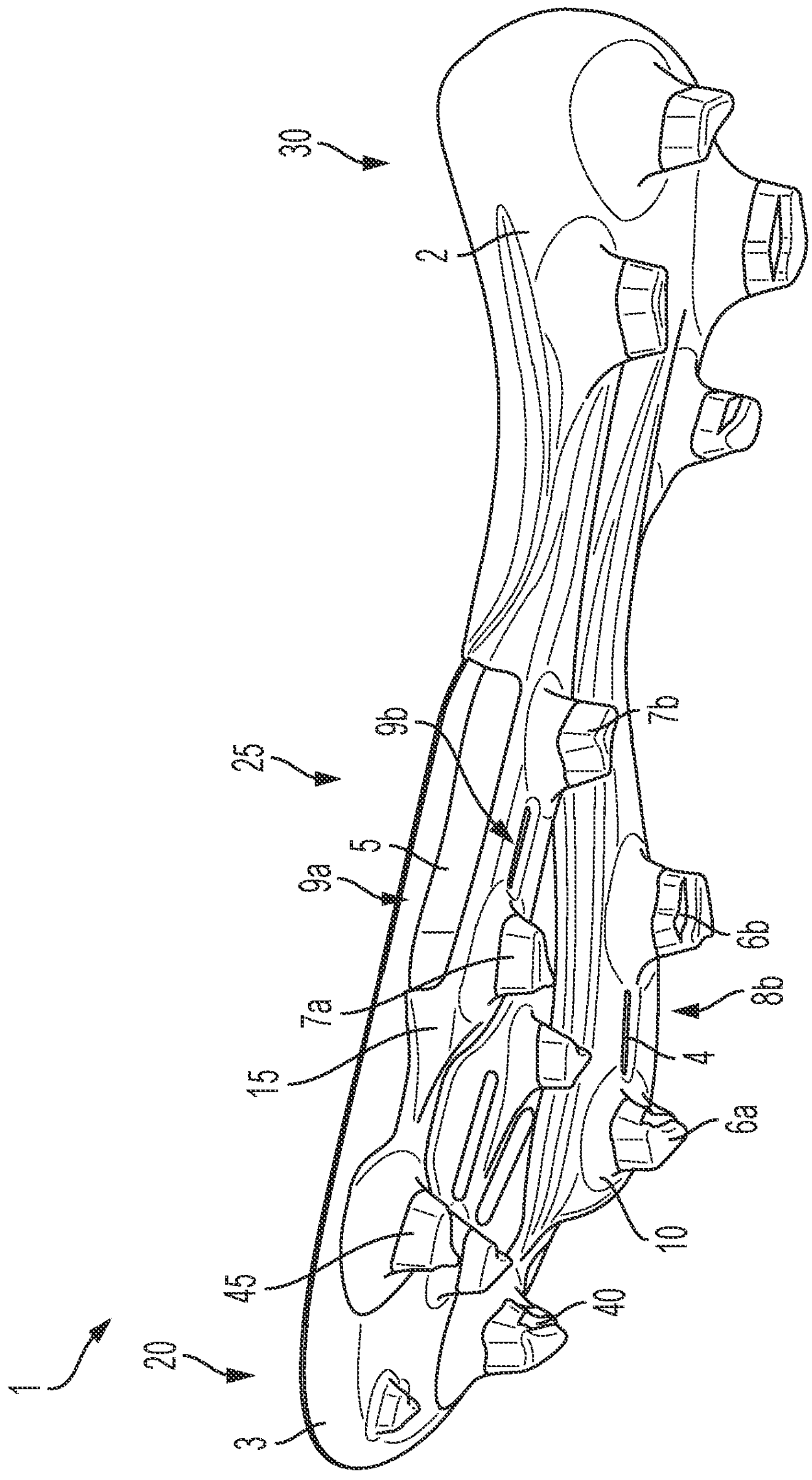
FIG. 1 shows a first exemplary outsole according to some embodiments in lateral view where the outsole is slightly tilted so that the underside is partially visible.

The indefinite articles "a," "an," and "the" include plural referents unless clearly contradicted or the context clearly dictates otherwise.

The term "comprising" is an open-ended transitional phrase. A list of elements following the transitional phrase "comprising" is a non-exclusive list, such that elements in addition to those specifically recited in the list can also be present. The phrase "consisting essentially of" limits the composition of a component to the specified materials and those that do not materially affect the basic and novel characteristic(s) of the component. The phrase "consisting of" limits the composition of a component to the specified materials and excludes any material not specified.

Where a range of numerical values comprising upper and lower values is recited herein, unless otherwise stated in specific circumstances, the range is intended to include the endpoints thereof, and all integers and fractions within the range. It is not intended that the disclosure or claims be limited to the specific values recited when defining a range. Further, when an amount, concentration, or other value or parameter is given as a range, one or more ranges, or as list of upper values and lower values, this is to be understood as specifically disclosing all ranges formed from any pair of any upper range limit or value and any lower range limit or value, regardless of whether such pairs are separately disclosed.

Outsoles according to embodiments of the present application are designed to provide various advantageous effects for a wearer. The outsoles can facilitate optimal athletic performance for a wearer participating a sport, for example football, while also providing footwear that is comfortable. The outsoles are designed to provide stiffness in particular areas and flexibility in other areas. The combination of stiffness and flexibility can facilitate desired athletic performance characteristics while also providing comfort. Outsoles according to embodiments of the present application are designed to address and/or pursue the following problems and/or objectives at least partially.

Outsoles for shoes, e.g. football shoes, that are optimized for fast running, i.e. sprinting, can exhibit a stiff material behaviour, which can create significant impairments for a wearer. Exemplarily, stiff outsoles can reduce comfortability for the wearer. Furthermore, stiff outsoles may reduce the feel for the ball since the overall flexibility of the shoe is reduced. Moreover, outsoles that exhibit linearly and/or homogeneously stiff behavior, may inhibit the wearer's ability to accelerate effectively due to limited metatarsal and/or toe flexion. This is exemplarily disadvantageous at a start of a sprint where more toe flexion is considered beneficial. Outsoles according to embodiments of the present disclosure can allow for fast running, i.e. sprinting, and at least partially avoid the above-mentioned drawbacks.

Many sports, such as football and/or American football, require multiple sprints during a game. Starting sprints on straight surfaces which may also be covered with grass can prove to be difficult, even with studs because there is no external object for pushing off as in sprinting in athletics, where starting blocks are regularly provided. Outsoles according to embodiments of the present disclosure can provide for a shoe that enables an improved start of sprints, i.e. allows for better pushing off.

Shoes such as football shoes regularly have relatively flat and/or stiff outsoles that make it difficult, or at least not easy, for the foot to roll during walking and/or moderate running and/or accelerating. However, it is also known that curved outsoles may lead to instability and/or limited ground contact. This is regularly not accepted for sports such as football, rugby, etc. Outsoles according to embodiments of the present disclosure can provide an outsole that allows for improved walking and/or moderate running and/or accelerating and at the same time at least partially avoids instability and/or limited ground contact.

Outsoles for shoes that comprise cushion elements regularly do not allow the properties provided by the cushion elements (e.g. compressibility and/or cushioning) to be adapted without the cushion elements themselves being changed. Because of this, the adaption of cushion elements, e.g. by changing the material, is regularly connected with significant effort. Outsoles according to embodiments of the present disclosure can at least partially overcome this drawback.

The outsole according to embodiments of the present disclosure comprises a first sole segment which comprises at least one stud and is arranged at least in a mid-foot portion of the outsole. Further, the outsole comprises a second sole segment which comprises at least one stud and is arranged at least in a toe portion of the outsole, wherein the first sole segment and the second sole segment overlap partially. Moreover, the outsole comprises a first cushion element being arranged between the first sole segment and the second sole segment, wherein the first cushion element overlaps with at least one first stud of the first or second sole segment. Furthermore, the outsole comprises a second cushion element being arranged between the first sole segment and the second sole segment, wherein the second cushion element overlaps with at least one second stud of the first or second sole segment.

In some embodiments, the first sole segment and/or the second sole segment may comprise a plurality of layers. Exemplarily, the first sole segment and/or the second sole segment may comprise a plurality of carbon fibre layers and/or glass fibre layers which are embedded in a polymer matrix. Nevertheless, the first sole segment and/or the second sole segment may also each be a single layer. The first sole segment and/or the second sole segment do not have to be closed layers but can also have a grid-like and/or frame-like structure. A grid-like and/or frame-like structure may be particularly advantageous for a reduced weight of the outsole. In some embodiments, the first sole segment and/or the second sole segment may comprise a polymer such as Polyamide 11 (PA 11) and/or Polyamide 12 (PA 12). In some embodiments, the first sole segment and/or the second sole segment may comprise a thermoplastic elastomer (TPE) such as polyether block amide (PEBA) and/or thermoplastic polyurethane (TPU). In some embodiments, the first sole segment and/or the second sole segment may be at least partially formed by injection moulding. Exemplarily, a layer may be moulded or a grid-like and/or frame-like support structure may be overmoulded. Further, composite materials, such as carbon fibre reinforced polymers, glass fibre reinforced polymers and/or other reinforced materials, may be comprised by the first sole segment and/or the second sole segment. In some embodiments, the first sole segment and/or the second sole segment may be at least partially formed by additive manufacturing methods (e.g. 3D printing methods) and/or composite processing methods. In some embodiments, a material of the first sole segment and/or the second sole segment may be less stiff in the toe portion than in a mid-foot portion.

As described herein, components (for example, the first sole segment the second sole segment) co-formed by injection moulding, overmoulding, or other similar co-forming manufacturing processes, are integrally formed components. Integrally formed components are integrally connected as a result of the co-forming process used to make the components.

Studs according to embodiments of the present disclosure, which may be also referred to as cleats, may serve to provide traction for the wearer on soft grounds such as grass fields. The use of studs is known from the field of football, i.e. soccer, American football, rugby and/or athletics. In some embodiments, the studs can be integrally formed with the first sole segment and/or the second sole segment. In some embodiments, the studs may be at least partially (e.g. the tips of the studs) injected onto a base material. In some embodiments, the base material may be at least partially injected onto the stud tips. In such embodiments, prefabricated stud tips are placed in a mold and are over-injected with the base material. The base material may comprise the first sole segment and/or the second sole segment. In some embodiments, the studs may comprise TPU. Integrally formed or injected studs eliminate the need to screw on and/or replace the studs. However, interchangeable studs or screw-on studs can also be used. In such embodiments, studs of different lengths and/or materials can be used for different ground conditions.

The mid-foot portion of the outsole may be referred to as the portion of the outsole which is configured to support the metatarsal bones of the wearer at least partially. The toe portion of the outsole may be referred to as the portion of the outsole which is configured to support the toes of the wearer at least partially. Generally, it is understood that the mid-foot of the wearer may be separated from the toe portion at the Metatarsophalangeal joints. Thereby, it is understood that the Metatarsophalangeal joints may be considered as part of the forefoot, however not as part of the mid-foot.

Since the first sole segment and the second sole segment overlap partially, it is understood that the segments cannot be completely congruent. Hence, weight may be saved. Moreover, since the first sole segment and the second sole segment each comprise at least one stud, it is understood that they are preferably both configured to engage with the ground.

In some embodiments, the first sole segment and the second sole segment overlap partially such that a portion of the first sole segment is disposed over a portion of the second sole segment. In some embodiments, the first sole segment and the second sole segment overlap partially such that a portion of the second sole segment is disposed over a portion of the first sole segment. Unless specified otherwise, a component described as “disposed over” another component is located above the another component in a vertical direction relative to a ground-facing surface of the outsole.

Further, by an overlapping area, i.e. an area where the first sole segment and the second sole segment overlap, a targeted setting of properties may be achieved. Exemplarily, the stiffness of the outsole and/or the support of the foot can be increased in the overlapping area. Optionally, the first sole segment overlaps partially with the second sole segment and/or the second sole segment overlaps partially with the first sole segment. Thereby the overlapping area may be further selectively engineered.

The first sole segment and the second sole segment may at least partially not overlap in one or more areas of the outsole. Particularly, the first sole segment and the second sole segment may at least partially not overlap in a first area of the outsole which supports the toes of a wearer. Thus, toe flexion may be enhanced, which can be advantageous at the start of a sprint where more toe flexion is beneficial. Further particularly, the second sole segment may comprise a softer, i.e. less stiff, material than the first sole segment so that a better feel for the ball and/or toe flexion is achieved while still providing sufficient support in the mid-foot area.

The first cushion element and/or the second cushion element, i.e. the cushion element/s, may be attached to the first sole segment and/or the second sole segment, e.g. by gluing, welding, overmoulding, and/or stitching. The cushion element/s may comprise at least one cushion pad and/or at least one spring element. Since the first cushion element and the second cushion element are arranged between the first sole segment and the second sole segment, it is understood that the cushion element/s may be arranged at least partially in the above-mentioned overlapping area. The cushion element/s may comprise a substantially elastic material behaviour. Thus, the cushion element/s may allow for improved energy return to the wearer. In some embodiments, the cushion element/s may also be viscoelastic, i.e. exhibit viscous behaviour and elastic behaviour simultaneously. This allows the cushion element/s to be adapted to load patterns that are typical for certain sports. Exemplarily, soft cushion element/s may be desired when walking, i.e. at low load speeds, whereas hard cushion element/s may be desired when sprinting is started, i.e. at high load speeds.

The first cushion element and/or the second cushion element may provide various advantages and/or fulfil different tasks.

First, the first cushion element and/or the second cushion element may serve to space the first sole segment and/or the second sole segment apart from each other, such that the second moment of area of the outsole may be increased. Hence, the stiffness of the outsole may be increased in areas where the first cushion element and/or the second cushion element are located. Since the cushion element/s may comprise a lighter material than the first sole segment and/or the second sole segment, stiffness may be increased with little additional weight.

Second, the cushion element/s may serve to cushion sections of a wearer’s foot and thereby increase comfort. Particularly, since the first cushion element and the second cushion element overlap with at least one stud respectively, they may avoid transferring uncomfortable pressure from the stud/s to the wearer’s foot. As a result, the first sole segment and/or the second sole segment can be made thinner, thus saving weight without reducing comfort.

Third, the first cushion element and/or the second cushion element may serve as an “integrated starting block” for the wearer which enables an improved start of sprints, i.e. allows for better pushing off. This is as the first cushion element and the second cushion element space the first sole segment and the second sole segment apart such that an elevation may be formed, e.g. on a ground-facing surface of the outsole, which allows for better pushing off.

Fourth, the first cushion element and/or the second cushion element may provide a "rocker effect" to the outsole. Rocker outsole designs are known for medical purposes, e.g. for reducing forefoot plantar pressures for people with diabetes, but also for increasing comfort of leisure shoes. However, the "rocker effect" may be particularly advantageous for outsoles with improved running properties, e.g. for outsoles of football shoes. As in the previous paragraph, the first cushion element and/or the second cushion element space the first sole segment and the second sole segment apart such that an elevation may be formed, particularly on a ground-facing surface of the outsole. Hence, a portion of a running surface of the outsole may be elevated such that a rolling effect, i.e. "rocker effect", is created. This can have a positive effect on performance because the wearer has to exert less force to overcome a pivot point, i.e. to roll the foot, during walking and/or moderate running and/or accelerating. The "rocker effect" created by the first cushion element and/or the second cushion element may be particularly advantageous for a wearer accelerating from an essentially standing position. When accelerating from the standing position, the "rocker effect" may particularly contribute to said positive effect on performance by reducing the force exertion required to accelerate, thereby increasing the wearer's rate of acceleration.

It is understood that the first cushion element and/or the second cushion element serving as "integrated starting block" may at the same time provide a "rocker effect" to the outsole. Further, since the first cushion element and/or the second cushion element may serve as the "integrated starting block" and/or provide the "rocker effect", their compression properties may allow that during high and/or vertical loading conditions, e.g. during sprinting, a disadvantageous influence, i.e. instability, due to the elevation of the outsole is avoided.

In some embodiments, the first sole segment and/or the second sole segment may comprise at least one aperture which overlaps at least partially with the first cushion element or the second cushion element. The at least one aperture may serve to adapt the stiffness of the respective sole segment. Further, the at least one aperture may also serve to adapt the compression properties of the cushion element with which the aperture overlaps. It is understood that the at least one aperture in the first sole segment and/or the second sole segment does not necessarily require a closed contour in the first sole segment or in the second sole segment. Rather, exemplarily, a cut-out in the first sole segment may be limited by the second sole segment such that the at least one aperture is formed.

Nevertheless, the at least one aperture may comprise a closed contour in the first sole segment or in the second sole segment. Thereby the stability of the at least one aperture may be increased. The at least one aperture may be a cut-out opening. In some embodiments, the at least one aperture may be an integrally formed opening, e.g. by means of injection moulding. The at least one aperture is optionally provided in the sole segment to which the at least one first stud and/or the at least one second stud are attached.

In some embodiments, the at least one aperture may comprise at least one bottom aperture which may be adapted such that the first cushion element and/or the second cushion element is exposed towards a surface on which the outsole is to be placed during normal use. The at least one bottom aperture may serve to locally reduce and/or adapt the stiffness of the outsole, i.e. of the respective sole segment. This may be advantageous as the overlap of the first sole segment and the second sole segment may lead to a jump in stiffness which may be at least partially compensated and/or adapted by the at least one bottom aperture.

As used herein, the phrases "exposed," "exposed towards" a surface or component, or "exposed in" a direction of, when referring to a cushion element in the context of the element's relationship with an aperture, mean that the cushion element is able to deform into the aperture towards the specified surface or component, or in the specified direction. In some embodiments, the phrases "exposed towards" a surface or component or "exposed in" in direction of, when referring to a cushion element in the context of the element's relationship with an aperture, also mean that the cushion element is visible through the aperture when viewed from the specified surface or component, or in the specified direction.

In some embodiments, the at least one aperture may comprise at least one side aperture which may be adapted such that the first cushion element and/or the second cushion element is exposed in a lateral direction of the outsole or a medial direction of the outsole. The at least one side aperture allows for adapting the compressibility of the cushion element with which the aperture overlaps. Particularly, the at least one side aperture may allow for adapting a vertical compressibility of the respective cushion element. This is as a vertical compression of the respective cushion element is at least locally not limited by material of the corresponding sole segment. Rather a substantially free compression of the respective cushion element is possible until the respective side aperture is closed. The term "vertical" in this regard refers to a direction which is perpendicular to a surface on which the outsole is to be placed during normal use.

In some embodiments, the at least one aperture may comprise at least one first aperture which overlaps at least partially with the first cushion element. Hence, the properties provided by the first cushion element may be individually adapted.

In some embodiments, the at least one aperture may comprise at least one second aperture which overlaps at least partially with the second cushion element. Hence, the properties provided by the second cushion element may be individually adapted.

It will be understood that the at least one first aperture and/or at least one second aperture may be configured as the aperture(s) as described above. Further, it will be also understood that the at least one first aperture and/or at least one second aperture may provide the advantages as the at least one aperture as described above.

In some embodiments, the first cushion element and/or the second cushion element as seen from a heel portion of the outsole preferably do not extend substantially beyond an area of the outsole which is configured to support Metatarsal fat pads. In such embodiments, an increased stiffness of the outsole beyond said area is avoided because the first cushion element and/or the second cushion element in said area may not increase the second moment of area of the outsole. Thus, toe flexion may be enhanced which is advantageous at the start of a sprint where more toe flexion is beneficial. The term "substantially" may refer to the aspect that the first cushion element and/or the second cushion element as seen from the heel portion of the outsole do not extend beyond the area of the outsole which is configured to support Metatarsal fat pads by more than 1 cm, and optionally 0.5 cm.

Figure 22:
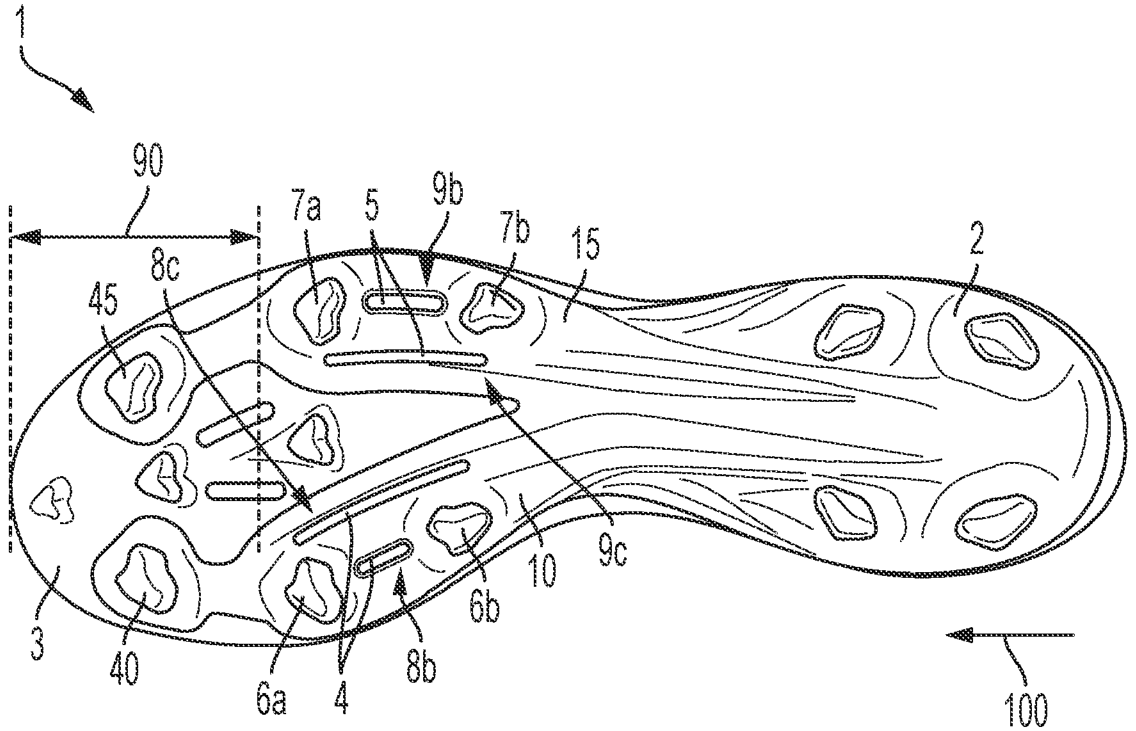
FIG. 22 shows the seventh exemplary outsole in bottom view.

In some embodiments, a minimal distance between a frontmost point of the outsole and a frontmost point of the first cushion element and/or the second cushion element may be between to % to 35% of the length of the outsole. In some preferred embodiments, the minimal distance between a frontmost point of the outsole and a frontmost point of the first cushion element and/or the second cushion element may be between 15% to 30% of the length of the outsole. In some preferred embodiments, the minimal distance between a frontmost point of the outsole and a frontmost point of the first cushion element and/or the second cushion element may be between 20% to 25% of the length of the outsole. The minimal distance for such embodiments may be measured between the frontmost point of the outsole and a point of the first cushion element and/or the second cushion element which is closest to the frontmost point of the outsole. Unless specified otherwise, the minimal distance between a frontmost point of the outsole and a frontmost point of the first cushion element and/or the second cushion element is measured in a straight line perpendicular to lines tangential to the frontmost point of the outsole and the frontmost point of the first cushion element and/or the second cushion element, as shown for example as distance 90 in FIG. 22.

In some embodiments, the first sole segment as seen from the heel portion may extend beyond the area of the outsole which is configured to support Metatarsal fat pads in a direction towards the toe portion with a reduced cross-section relative to a cross-section in an area where the first sole segment overlaps with the first cushion element and/or the second cushion element. By the first sole segment extending beyond said area it may be prevented that the stiffness changes abruptly, which could have a negative impact on comfort and/or functionality. Instead, a continuous reduction in stiffness is achieved.

In some embodiments, the at least one first stud and the at least one second stud may be attached to the first sole segment. Thereby an improved start of sprints may be achieved. This is as a transmission of forces may be improved, since the first sole segment is arranged at least in the mid-foot portion of the outsole, where a high force is applied during the start of sprinting. The transmission of forces may be particularly improved when the first sole segment at least partially supports the area of the outsole which is configured to support Metatarsal fat pads. This improvement of force transmission may be achieved because this area is the area through which the highest force is transmitted during normal use of the outsole. Moreover, the first sole segment may extend from the heel portion. Hence, an instability between the mid-foot portion and the heel portion is avoided, which in turn further contributes to an improved start of sprints.

The first cushion element and/or the second cushion element may comprise a thickness in the range from 1 mm to 10 mm. In some preferred embodiments, the first cushion element and/or the second cushion element may comprise a thickness in a range from 2 mm to 6 mm. These thicknesses have proven to be beneficial, as they sufficiently improve cushioning and/or increase stiffness without adding too much material, i.e. weight, to the outsole. Further, these thicknesses allow that the first cushion element and/or the second cushion element may serve as an "integrated starting block" for the wearer which enables an improved start of sprints, i.e. allows for better pushing off, without causing instability due to the wearer being raised excessively away from the ground. Even further, these thicknesses have proven to be sufficient for providing the above-mentioned "rocker effect", without impeding the feel for the ball.

In some embodiments, the first cushion element may overlap with two first studs and/or the second cushion element may overlap with two second studs. In some preferred embodiments, the first cushion element overlaps with exactly two first studs and/or the second cushion element overlaps with exactly two second studs. In some preferred embodiments, the at least one bottom aperture as described above extends at least partially between the two first studs or between the two second studs. This arrangement of the at least one bottom aperture may be advantageous because two studs per cushion element have proven to provide sufficient traction such that the cushion element may serve as an integrated starting block for the wearer which enables an improved start of sprints.

In some embodiments, the first cushion element may be arranged on a medial part of the outsole and the second cushion element may be arranged on a lateral part of the outsole, wherein a minimal distance between the first cushion element and the second cushion element is in the range from 3 mm to 50 mm, including subranges. For example, in some embodiments, the minimal distance between the first cushion element and the second cushion element can range from 3 mm to 45 mm, from 3 mm to 40 mm, from 3 mm to 30 mm, from 3 mm to 25 mm, from 3 mm to 15 mm, from 5 mm to 50 mm, from 10 mm to 50 mm, from 15 mm to 50 mm, from 25 mm to 50 mm, from 30 mm to 50 mm, or from 40 mm to 50 mm. In some preferred embodiments, the minimal distance between the first cushion element and the second cushion element is in the range from 5 mm to 40 mm. In some preferred embodiments, the minimal distance between the first cushion element and the second cushion element is in the range from 10 mm to 30 mm. In some preferred embodiments, the minimal distance between the first cushion element and the second cushion element is in the range from 15 mm to 25 mm. By said arrangement of the first cushion element and the second cushion element the lateral and the medial side of the foot of the wearer may be individually supported which may increase stability. Further, by means of said minimal distances between the first cushion element and the second cushion element a deformation of one cushion element influencing the other cushion element may be avoided. This was found to increase the stability provided by the outsole even further, particularly during fast running, e.g. sprinting.

As used above, the term "minimal distance" is the smallest distance between two cushion elements as measured from the respective innermost points of the inside edges of the cushion elements, e.g., from the innermost point of the lateral edge of a medial cushion element to the innermost point of the medial edge of a lateral cushion element.

In some embodiments, the first cushion element and/or the second cushion element may be at least partially arranged in the mid-foot portion, wherein preferably the first sole segment and the second sole segment overlap in the mid-foot portion, wherein further preferably the first sole segment and the second sole segment overlap in the toe portion. By this configuration an elevation may be formed in the mid-foot portion, e.g. on a ground-facing surface of the outsole, which allows better pushing off. Hence, this elevation may serve as an "integrated starting block" for the wearer. Thus, the outsole may allow for an improved start of sprints.

In some embodiments, the first cushion element and/or the second cushion element may comprise a foam material. Foam materials have proven to be beneficial since they allow for a compromise between damping, i.e. comfort, and elasticity, i.e. energy recovery. The foam material may comprise a polyamide, a polyether block amide, an expanded polyether block amide, a thermoplastic polyurethane, an expanded thermoplastic polyurethane, ethylene vinyl acetate (EVA) and/or a thermoplastic co-polyester. Furthermore, the foam material may be manufactured in a particular process to achieve advantageous properties. Exemplarily, utilising a particle foam has been shown to be advantageous in the sporting goods industry, as exemplarily described in US 2014/366405 A1 and US 2018/035755 A1. Thereby compact polymer granules are foamed to form expanded foam beads. These beads are then joined together at their surfaces by means of applying heat that at least partially melts the particle surfaces. For example, Steam Chest Moulding and/or Radio Frequency Fusion may be applied therefor. Other specific process adaptations can also be advantageous. For example, a gaseous blowing agent in an autoclave/extrusion/injection moulding process may be replaced by a blowing agent in a supercritical state. In some embodiments, the first cushion element and/or the second cushion element may comprise a body (e.g. a foam body or a 3-D printed body) and a cover layer or coating disposed on the body to protect the body from dirt and/or damage.

In some embodiments, the first cushion element and/or the second cushion element may comprise a 3D-printed component, for example, a 3D-printed lattice structure. 3D-printed components have proven to be advantageous because they can create anisotropic material behaviour, so that the properties of the outsole can be specifically adapted depending on the direction. Further, 3D-printed lattice structures allow visual inspection due to the lattice structure, so that material failure in the cushion elements can be identified more easily.

In some embodiments, the first cushion element and/or the second cushion element may comprise a material which has a strain rate dependent material behaviour. This allows the cushion element/s to be adapted to load patterns that are typical for certain sports. Exemplarily, it may be desirable that soft cushion element/s are desired when walking, i.e. at low load speeds and low strain rates, whereas hard cushion element/s are desired when sprinting is started, i.e. at high load speeds and high strain rates.

In some embodiments, the first cushion element (for example, a medial cushion element) may comprise a higher compressibility than the second cushion element (for example, a lateral cushion element). In some embodiments, the first cushion element (for example, a medial cushion element) may comprise a first compressibility characterized by a first change in height when a force is applied to it in a vertical direction. The first change in height is defined as the difference in the height (i.e., the distance between the top surface and bottom surface) of the first cushion element in a (assembled) state without compression to the height of the first cushion element in a compressed state under a defined force. In some embodiments, the second cushion element (for example, a lateral cushion element) may accordingly comprise a second compressibility characterized by a second change of height when the same defined force is applied to it in the vertical direction. The second change in height is defined as the difference in the height (i.e., the distance between the top surface and bottom surface) of the second cushion element in a (assembled) state without compression to the height of the second cushion element in a compressed state under the defined force. In such embodiments, the second change of height is less than the first change of height. In some embodiments, the second change of height is less than or equal to 95% of the first change of height. In some embodiments, the second change of height is less than or equal to 80% of the first change of height. In some embodiments, the second change of height is less than or equal to 60% of the first change of height. In some embodiments, the second change of height is less than or equal to 30% of the first change of height. In some embodiments, the second change of height is less than or equal to 10% of the first change of height.

In some embodiments, the second cushion element (for example, a lateral cushion element) may comprise a higher compressibility than the first cushion element (for example, a medial cushion element). In some embodiments, the second cushion element (for example, a lateral cushion element) may comprise a first compressibility characterized by a first change in height when a force is applied to it in a vertical direction. The first change in height is defined as the difference in the height (i.e., the distance between the top surface and bottom surface) of the second cushion element in a (assembled) state without compression to the height of the second cushion element in a compressed state under a defined force. In some embodiments, the first cushion element (for example, a medial cushion element) may accordingly comprise a second compressibility characterized by a second change of height when the same defined force is applied to it in the vertical direction. The second change in height is defined as the difference in the height (i.e., the distance between the top surface and bottom surface) of the first cushion element in a (assembled) state without compression to the height of the first cushion element in a compressed state under the defined force. In such embodiments, the second change of height is less than the first change of height. In some embodiments, the second change of height is less than or equal to 95% of the first change of height. In some embodiments, the second change of height is less than or equal to 80% of the first change of height. In some embodiments, the second change of height is less than or equal to 60% of the first change of height. In some embodiments, the second change of height is less than or equal to 30% of the first change of height. In some embodiments, the second change of height is less than or equal to 10% of the first change of height.

In some embodiments, the first cushion element (for example, a medial cushion element) may be made of a first material, the second cushion element (for example, a lateral cushion element) may be made of a second material, and the first material comprises a higher compressibility than the second material. In these embodiments, the first cushion element may be deformed more easily under a compressive force. By deforming more easily, the compressibility of the first cushion element can aid a wearer during certain push off movements. For example, the higher compressibility of the first cushion element can serve as an "integrated starting block" for the wearer that enables improved acceleration at the start of sprints, improved acceleration during a sharp change in direction (i.e., a cut), or both. For example, in a case where a medial cushion element comprises a higher compressibility, the medial side of a wearer's foot can be lower (closer to the ground) relative to the lateral side of the foot when the sole is under a compressive load, thereby creating a starting block in transverse direction.

In some embodiments, the second cushion element (for example, a lateral cushion element) may be made of a first material, the first cushion element (for example, a medial cushion element) may be made of a second material, and the first material comprises a higher compressibility than the second material. In these embodiments, the second cushion element may be deformed more easily under a compressive load. By deforming more easily, the compressibility of the second cushion element can aid a wearer during certain push off movements.

In some embodiments, the first and second materials may be different material types. For example, the first and second materials may be different polymeric foam types, such a polyamide foam and ethylene vinyl acetate (EVA) foam. In some embodiments, the first and second materials may be same material with a different level of porosity. For example, the first material may be an EVA foam with a first porosity and the second material may be the same EVA foam a second porosity less than the first porosity. In some embodiments, the first and second material may be different 3D-printed lattice structures having different compressibilities.

In some embodiments, the first cushion element is made of a first material having a first compressibility characterized by a first change in height when a force is applied to the first material in a vertical direction, the second cushion element is made of a second material having a second compressibility characterized by a second change in height when the same force is applied to the second material in the vertical direction, and the second change of height is less than the first change of height. In some embodiments, the second change of height is less than or equal to 95% of the first change of height. In some embodiments, the second change of height is less than or equal to 80% of the first change of height. In some embodiments, the second change of height is less than or equal to 60% of the first change of height. In some embodiments, the second change of height is less than or equal to 30% of the first change of height. In some embodiments, the second change of height is less than or equal to 10% of the first change of height.

In some embodiments, the second cushion element is made of a first material having a first compressibility characterized by a first change in height when a force is applied to the first material in a vertical direction, the first cushion element is made of a second material having a second compressibility characterized by a second change in height when the same force is applied to the second material in the vertical direction, and the second change of height is less than the first change of height. In some embodiments, the second change of height is less than or equal to 95% of the first change of height. In some embodiments, the second change of height is less than or equal to 80% of the first change of height. In some embodiments, the second change of height is less than or equal to 60% of the first change of height. In some embodiments, the second change of height is less than or equal to 30% of the first change of height. In some embodiments, the second change of height is less than or equal to 10% of the first change of height.

In some embodiments, first and second cushion elements may comprise first and second undeformed heights (i.e., the distance between the top surface and bottom surface of the elements) that are equal. In some embodiments, the first cushion element (for example, a medial cushion element) may comprise a first undeformed height and the second cushion element (for example, a medial cushion element) may comprise a second undeformed height less than the first undeformed height. In some embodiments, the first cushion element (for example, a medial cushion element) may comprise a first undeformed height and the second cushion element (for example, a medial cushion element) may comprise a second undeformed height greater than the first undeformed height.

In some embodiments, the first cushion element is made of a first material having a first compressibility, the second cushion element is made of a second material having a second compressibility, and the first compressibility is at least 20% greater than or at least 20% less than the second compressibility. In some embodiments, the first cushion element is made of a first material having a first compressibility, the second cushion element is made of a second material having a second compressibility, and the first compressibility is at least 50% greater than or at least 50% less than the second compressibility.

In some embodiments, the first cushion element and/or the second cushion element may extend along 10% to 80% of a length of the outsole. In some preferred embodiments, the first cushion element and/or the second cushion element may extend along 15% to 70% of the length of the outsole. In some preferred embodiments, the first cushion element and/or the second cushion element may extend along 20% to 60% of the length of the outsole. In some preferred embodiments, the first cushion element and/or the second cushion element may extend along 25% to 50% of the length of the outsole. In some preferred embodiments, the first cushion element and/or the second cushion element may extend along 30% to 40% of the length of the outsole. These lengths have proven to be beneficial, as they sufficiently improve cushioning and/or increase stiffness without adding to much material, i.e. weight, to the outsole. Further, these lengths allow that the first cushion element and/or the second cushion element may serve as an "integrated starting block" for the wearer which enables an improved start of sprints, i.e. allows for better pushing off.

In some embodiments, a distance between a rearmost point of the outsole and a rearmost point of the first cushion element and/or the second cushion element may be between 30% to 60% of the length of the outsole. In some preferred embodiments, the distance between a rearmost point of the outsole and a rearmost point of the first cushion element and/or the second cushion element may be between 35% to 55% of the length of the outsole. In some preferred embodiments, the distance between a rearmost point of the outsole and a rearmost point of the first cushion element and/or the second cushion element may be between 40% to 50% of the length of the outsole. Particularly the distance may be measured between the rearmost point of the outsole and a point of the first cushion element and/or the second cushion element which is closest to the rearmost point of the outsole. By this configuration, an elevation, i.e. "integrated starting block", may be formed in a portion of the outsole, which allows better pushing off. Hence, this elevation may serve as an "integrated starting block" for the wearer. Thus, the outsole may allow for an improved start of sprints.

In some embodiments, the first sole segment may be branched in a direction to the toe portion of the outsole into at least two branches. In such embodiments, each of the two branches may at least partially overlap with the second sole segment. In some embodiments, a first branch may comprise the at least one first stud and may at least partially house the first cushion element. In some embodiments, a second branch may comprise the at least one second stud and may at least partially house the second cushion element. Optionally, the first branch extends along the medial part of the outsole and the second branch extends along the lateral part of the outsole. By means of said branches the lateral and the medial side of the foot of the wearer may be individually supported which may increase stability. Further, by means of said branches it may be avoided that a deformation of one cushion element significantly influences the other cushion element. This was found to increase the stability provided by the outsole, particularly during fast running, e.g. sprinting.

In the following will be described that the first branch may comprise the above-described at least one first aperture and/or that the second branch may comprise the above-described at least one second aperture. In this regard it will be understood that these apertures may have characteristics of the apertures as described above. Furthermore, it will be also understood that these apertures may provide the advantages as the apertures as described above.

For example, in some embodiments, the first branch may comprise the at least one first aperture. In such embodiments, the at least one first aperture may comprise a lateral side aperture being directed to the lateral part of the outsole, such that the first cushion element is exposed towards the second branch. This lateral side aperture may be configured as the at least one side aperture described above and provide the corresponding advantages. Further, by the lateral side aperture being directed to the lateral part of the outsole, such that the first cushion element is exposed towards the second branch, the first cushion element may be protected from side impacts.

As another example, in some embodiments, the second branch may comprise the at least one second aperture. In such embodiments, the at least one second aperture may comprise a medial side aperture directed to the medial part of the outsole, such that the second cushion element is exposed towards the first branch. This medial side aperture may be configured as the at least one side aperture described above and provide the corresponding advantages. By the medial side aperture being directed to the medial part of the outsole, such that the second cushion element is exposed towards the first branch, the second cushion element may be protected from side impacts.

In some embodiments, the first branch may comprise the at least one first aperture, wherein the at least one first aperture comprises a first bottom aperture such that the first cushion element is exposed towards a surface on which the outsole is to be placed during normal use. This first bottom aperture may be configured as the at least one bottom aperture described above and provide the corresponding advantages.

In some embodiments, the second branch may comprise the at least one second aperture, wherein the at least one second aperture comprises a second bottom aperture such that the second cushion element is exposed towards a surface on which the outsole is to be placed during normal use. This second bottom aperture may be configured as the at least one bottom aperture as described above and provide the corresponding advantages.

In some embodiments, the first branch may comprise the at least one first aperture, wherein the at least one first aperture comprises a medial side aperture such that the first cushion element is exposed medially outward from the outsole. This medial side aperture may be configured as the at least one side aperture described above and provide the corresponding advantages. Even further, this medial side aperture may allow the first cushion element to be visually inspected, so that potential material deterioration in the first cushion element can be identified more easily. Further, such an aperture may be particularly advantageous together with the above-described apertures which the first branch may comprise. For example, if the first branch comprises the lateral side aperture being directed to the lateral part of the outsole, such that the first cushion element is exposed towards the second branch, then the medial side aperture may serve to obtain an improved balancing.

In some embodiments, the second branch may comprise the at least one second aperture, wherein the at least one second aperture comprises a lateral side aperture such that the second cushion element is exposed outward from the outsole in a lateral direction. This lateral side aperture may be configured as the at least one side aperture described above and provide the corresponding advantages. Even further, this lateral side aperture may allow the second cushion element to be visually inspected, so that potential material deterioration in the second cushion element can be identified more easily. Further, such an aperture may be particularly advantageous together with the above-described apertures which the second branch may comprise. For example, if the second branch comprises the medial side aperture being directed to the medial part of the outsole, such that the second cushion element is exposed towards the first branch, then the lateral side aperture may serve to obtain an improved balancing.

In some embodiments, the first branch may bridge the first cushion element in a longitudinal direction of the outsole and may be attached to the second sole segment at least before bridging the first cushion element and after bridging the first cushion element. Thereby the stability of the outsole may be increased. Moreover, shear forces acting on the first cushion element may be decreased, since loads, e.g. due to bending of the outsole, may be directly transferred between the first sole segment and the second sole segment.

In some embodiments, the second branch may bridge the second cushion element in a longitudinal direction of the outsole and may be attached to the second sole segment at least before bridging the second cushion element and after bridging the second cushion element. Thereby the stability of the outsole may be increased. Moreover, shear forces acting on the second cushion element may be decreased, since loads, e.g. due to bending of the outsole, may be directly transferred between the first sole segment and the second sole segment.

In some embodiments, the first branch may be attached to the second sole segment at least partially along the length of the first cushion element. Particularly, in some embodiments, the first branch may be attached to the second sole segment at least partially along the length of the first cushion element on a lateral side of the first cushion element. Thereby the stability of the outsole may be further increased. Moreover, shear forces acting on the first cushion element may be decreased, since loads, e.g. due to bending of the outsole, may be transferred even more directly between the first sole segment and the second sole segment.

In some embodiments, the second branch may be attached to the second sole segment at least partially along the length of the second cushion element. Particularly, in some embodiments, the second branch may be attached to the second sole segment at least partially along the length of the second cushion element on a medial side of the second cushion element. Thereby the stability of the outsole may be further increased. Moreover, shear forces acting on the second cushion element may be decreased, since loads, e.g. due to bending of the outsole, may be transferred even more directly between the first sole segment and the second sole segment.

In some embodiments, the first branch may terminate in a stud which is attached to the first sole segment. Hence, in such embodiments, the first branch of the first sole segment may be attached to the second sole segment by means of said stud. Thereby the fixation of the first sole segment at the second sole segment may be improved. In some embodiments, the second branch may terminate in a stud which is attached to the first sole segment. Hence, in such embodiments, the second branch of the first sole segment may be attached to the second sole segment by means of said stud. Thereby the fixation of the first sole segment at the second sole segment may be improved. It is understood that the branches may terminate in the same stud or in different studs.

In some embodiments, a cross-section of the first branch and/or the second branch may be reduced after bridging the first cushion element and/or the second cushion element as seen from the heel portion of the outsole. Thereby it may be prevented that the stiffness changes abruptly, which could have a negative impact on comfort and/or functionality. Instead, a continuous reduction in stiffness is achieved.

In some embodiments, at least one reinforcement element may overlap with the first sole segment and/or the second sole segment. In some embodiments, the at least one reinforcement element can also overlap with the first cushion element and/or the second cushion element. In some embodiments, the at least one reinforcement element may be configured to be located between the foot of a wearer and the first cushion element and/or the second cushion element. Hence, support for the foot of the wearer may be provided, without increasing the thickness of the first sole segment and/or the second sole segment. In some embodiments, said at least one reinforcement element may comprise a fibre reinforced composite such as a carbon fibre reinforced polymer, a glass fibre reinforced polymer, and/or an aramid fibre reinforced polymer. In some embodiments, the at least one reinforcement element may comprise or even substantially consist of a polyamide. In some embodiments, the at least one reinforcement element may comprise a rod shape, a finger shape, and/or a plate shape.

In some embodiments, the first sole segment and/or the second sole segment do not extend along a full length of the outsole. This can allow targeted engineering of the properties of the outsole along the length of the outsole. Exemplarily, a first sole segment which may be more rigid compared to a second sole segment may extend from the heel portion into the mid-foot portion. Thereby the second sole segment may extend from the toe portion into the mid-foot portion, where it overlaps with the first sole segment. Hence, on one hand toe flexion may be enhanced which is advantageous at the start of a sprint where more toe flexion is beneficial, whereas on the other hand stability is enhanced in the heel portion.

Even further, by the first sole segment and/or the second sole segment not extending along a full length of the outsole, the material used may be reduced and thus the weight of the outsole can be reduced.

Embodiments of the present disclosure are also directed to a shoe comprising a shoe upper and an outsole as described above. It will be understood that the advantages as described above with reference to the outsole also apply to the shoe.

Some embodiments of the present disclosure are directed to a method for the manufacturing of an outsole, particularly an outsole as described above. It is understood that the features and respective advantages which are described above with regards to the outsole may also apply to the described method for the manufacturing of an outsole. The method comprises the following steps:

(a) Manufacturing a first sole segment;
(b) Placing a first placeholder onto a medial part of the first sole segment and placing a second placeholder onto a lateral part of the first sole segment;
(c) Injection moulding a second sole segment, such that the first sole segment and the second sole segment are at least partially connected and such that the first placeholder and the second placeholder are each at least partially located between the first sole segment and the second sole segment;
(d) Removing the first placeholder and the second placeholder, and
(e) Arranging a first cushion element and a second cushion element between the first sole segment and the second sole segment, wherein the position of the first cushion element at least partially corresponds to the position where the first placeholder was placed, and wherein the position of the second cushion element at least partially corresponds to the position where the second placeholder was placed.

This method can allow for an increased productivity. For example, increased productivity can be achieved by avoiding the need for a foaming step. As another example, because the first cushion element and/or the second cushion element may be pre-shaped elements, these elements can be quickly arranged, which can reduce production times.

In some embodiments, the manufacturing of the first sole segment in step (a) may comprise injection moulding, 3D-printing, and/or compression moulding.

In some embodiments, between step (a) and step (c), the method may comprise a further step of placing the first sole segment in a mould for the injection moulding in step (c). In such embodiments, if the first sole segment is manufactured by means of injection moulding and/or compression moulding, the first sole segment may remain in the respective mould for the subsequent steps. Hence, the efficiency of the method may be increased.

In some embodiments, placeholders used during injection moulding of the second sole segment may serve to keep spaces, e.g. cavities, open into which the cushion elements are to be arranged. Further, the placeholders may also ensure that the second sole segment comprises a fixed portion which is two-dimensionally connected to the first sole segment and at least one movable portion, as described in the following. In some embodiments, the placeholders are metal elements. In some embodiments, the placeholders may be 3D printed. In some embodiments, the placeholders may comprise a lattice and/or a cell structure. In some embodiments, the first placeholder substantially corresponds in shape to the first cushion element. Similarly, in some embodiments, the second placeholder may substantially correspond in shape to the second cushion element. Thus, the cushion elements may be easily arranged in the outsole.

As described above with regards to the outsole, a first branch of the first sole segment may at least partially house the first cushion element. Furthermore, a second branch of the first sole segment may at least partially house the second cushion element. Hence, in some embodiments, the first placeholder may serve to provide a cavity in the first branch, and the second placeholder may serve to provide a cavity in the second branch.

It is understood that the method steps are preferably executed in the order as given above. Particularly since the efficiency may be enhanced thereby.

After step (c) the second sole segment may comprise a fixed portion which is two-dimensionally connected to the first sole segment. Further, at least after step (c) the second sole segment may comprise at least one movable portion which is movable relative to the first sole segment such that a distance between the at least one movable portion and the first sole segment can be changed, wherein the at least one movable portion at least partially overlaps with the first placeholder and/or the second placeholder.

The at least one movable portion may comprise a first movable portion overlapping with the first placeholder, and a second movable portion overlapping with the second placeholder. It is understood that the first movable portion may overlap with the first branch of the first sole segment and the second movable portion may overlap with the second branch of the first sole segment.

In some embodiments, removing the first placeholder and the second placeholder and/or arranging the first cushion element and the second cushion element between the first sole segment and the second sole segment may comprise changing the distance between the at least one movable portion and the first sole segment. Hence, the placeholders may be removed more easily. Moreover, the arrangement of the cushion elements in the outsole may be facilitated. Furthermore, cushion elements with different heights may be used because of the movability of the portions. This may allow for an easier customisation of the outsole.

In some embodiments, the fixed portion may be at least arranged in a toe portion of the outsole, a mid-foot portion of the outsole, or both. Thereby the outsole may be provided with sufficient stiffness, i.e. stability.

The first cushion element and/or the second cushion element may be adhered to the first sole segment. Moreover, the at least one movable portion of the second sole segment may be adhered to the first sole segment, the first cushion element and/or the second cushion element. Thereby the at least one movable portion of the second sole segment may be fixed and the cushion elements may be secured. Said adhering may be conducted by means of an adhesive, optionally together with a primer. Further, the adhering may be additionally or alternatively be conducted by means of welding, e.g. laser welding, plasma welding, IR welding, and/or the like. In some embodiments, the adhering may be additionally or alternatively be conducted by means of compression moulding.

Some embodiments of the present disclosure are directed to an outsole for a shoe, for example a football shoe, comprising a lasting board. In such embodiments, the sole can comprise a first sole segment, a second sole segment, a first cushion element, and a second cushion element. It is understood that these elements may be configured as described above. Further, the respective advantages may apply for the outsole according to the further aspect accordingly.

In such embodiments, the outsole comprises a first sole segment which comprises at least two studs and is arranged at least in a mid-foot portion of the outsole. Further, the outsole comprises a second sole segment, wherein the first sole segment and the second sole segment overlap partially. Moreover, the outsole comprises a first cushion element being arranged between the first sole segment and the second sole segment, wherein the first cushion element overlaps with at least one first stud of the first sole segment. Furthermore, the outsole comprises a second cushion element being arranged between the first sole segment and the second sole segment, wherein the second cushion element overlaps with at least one second stud of the first sole segment.

In some embodiments, the second sole segment may be a lasting board and particularly a forefoot lasting board. Hence, the first cushion element and/or second cushion element may be arranged between the first sole segment and the lasting board. Thereby the lasting board may be covered with the first sole segment. In some embodiments, the lasting board may be completely covered with the first sole segment. In some embodiments, the lasting board may comprise pins to interact with inner recesses of the studs of the first sole segment. In some embodiments, the lasting board may further comprise slight recesses for at least partially accommodating the first cushion element and/or second cushion element. Besides the lasting board, a strobel last may be provided in the heel portion, i.e. the backfoot, of the sole.

The described figures each show at least one outsole 1 according to some embodiments. The reference signs for corresponding features have been used consistently. Accordingly, it is refrained from describing all already described features again.

FIG. 1 shows a first exemplary outsole 1 for a shoe 50, namely a football shoe. The outsole 1 comprises a first sole segment 2 which comprises multiple studs 6*a*, 6*b*, 7*a*, 7*b*. Said first sole segment extends from a toe portion 20 of the outsole 1 to a heel portion of the outsole 1. Further, the outsole 1 comprises a second sole segment 3 which comprises three studs and extends from a toe portion 20 of the outsole 1 in direction to a mid-foot portion of the outsole 1. The first sole segment 2 and the second sole segment 3 overlap partially. Thereby the first sole segment 2 and the second sole segment 3 do not extend along a full length of the outsole 1. Moreover, the outsole comprises a first cushion element 4 being arranged between the first sole segment 2 and the second sole segment 3. Said first cushion element 4 overlaps with two first studs 6*a*, 6*b* of the first sole segment 2. Even further, the outsole 1 comprises a second cushion element 5 being arranged between the first sole segment 2 and the second sole segment 3. Said second cushion element 5 overlaps with two second studs 7*a*, 7*b* of the first sole segment 2. The first studs 6*a*, 6*b* and the second studs 7*a*, 7*b* are attached to the first sole segment 2. The first cushion element 4 is arranged on a medial part of the outsole 1 and the second cushion element 5 is arranged on a lateral part of the outsole 1.

As can be seen from FIGS. 1 to 4, the first sole segment 2 comprises four apertures 8*a*, 8*b*, 9*a*, 9*b* which overlap at least partially with the first cushion element 4 or the second cushion element 5.

Particularly, these four apertures 8*a*, 8*b*, 9*a*, 9*b* comprise two bottom apertures 8*b*, Thereby a first bottom aperture 8*b* is adapted such that the first cushion element 4 is exposed towards a surface on which the outsole 1 is to be placed during normal use. The first bottom aperture 8*b* extends at least partially between the two first studs 6*a*, 6*b*. A second bottom aperture 9*b* is adapted such that the second cushion element 5 is exposed towards a surface on which the outsole 1 is to be placed during normal use. The second bottom aperture 9*b* extends at least partially between the two second studs 7*a*, 7*b*.

Further particularly, the four apertures 8*a*, 8*b*, 9*a*, 9*b* comprise two side apertures 8*a*, 9*a* which are adapted such that the first cushion element 4 is exposed in a medial direction of the outsole 1 and the second cushion element 5 is exposed in a lateral direction of the outsole 1. Both side apertures 8*a*, 9*a* do not have a closed contour in the first sole segment. Rather, they are each a cut-out in the first sole segment which is limited by the second sole segment such that the respective aperture 8*a*, 9*a* is formed.

Figure 5:
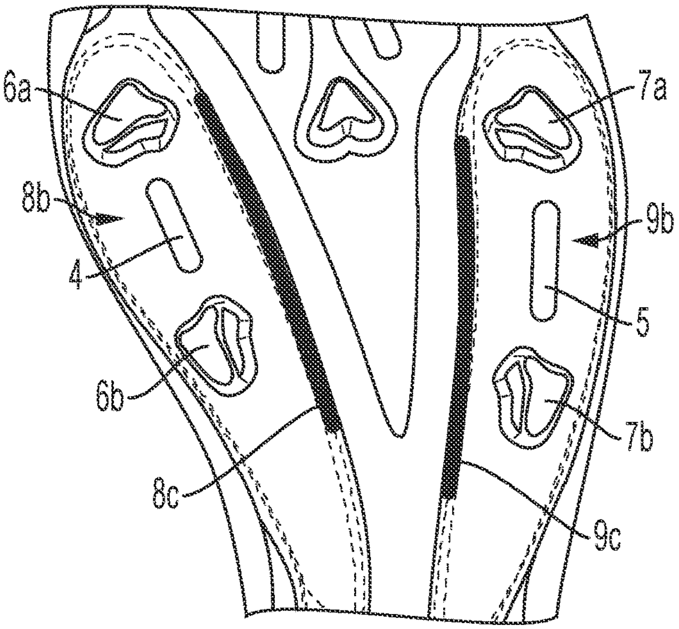
FIG. 5 shows a detail of the first exemplary outsole in bottom view with a modification according to some embodiments.

FIG. 5 shows a detail of the first exemplary outsole according to some embodiments in bottom view with the modification that the first sole segment 2 comprises two further apertures 8*c*, 9*c* which overlap at least partially with the first cushion element 4 or the second cushion element 5. The modification which is illustrated by FIG. 5 is particularly shown by FIGS. 16 to 19.

Generally regarding the description of the figures, the apertures which overlap at least partially with the first cushion element 4 are referred to as first apertures 8*a*, 8*b*, 8*c*. The apertures which overlap at least partially with the second cushion element 5 are referred to as second apertures 9*a*, 9*b*, 9*c*.

Figure 2:
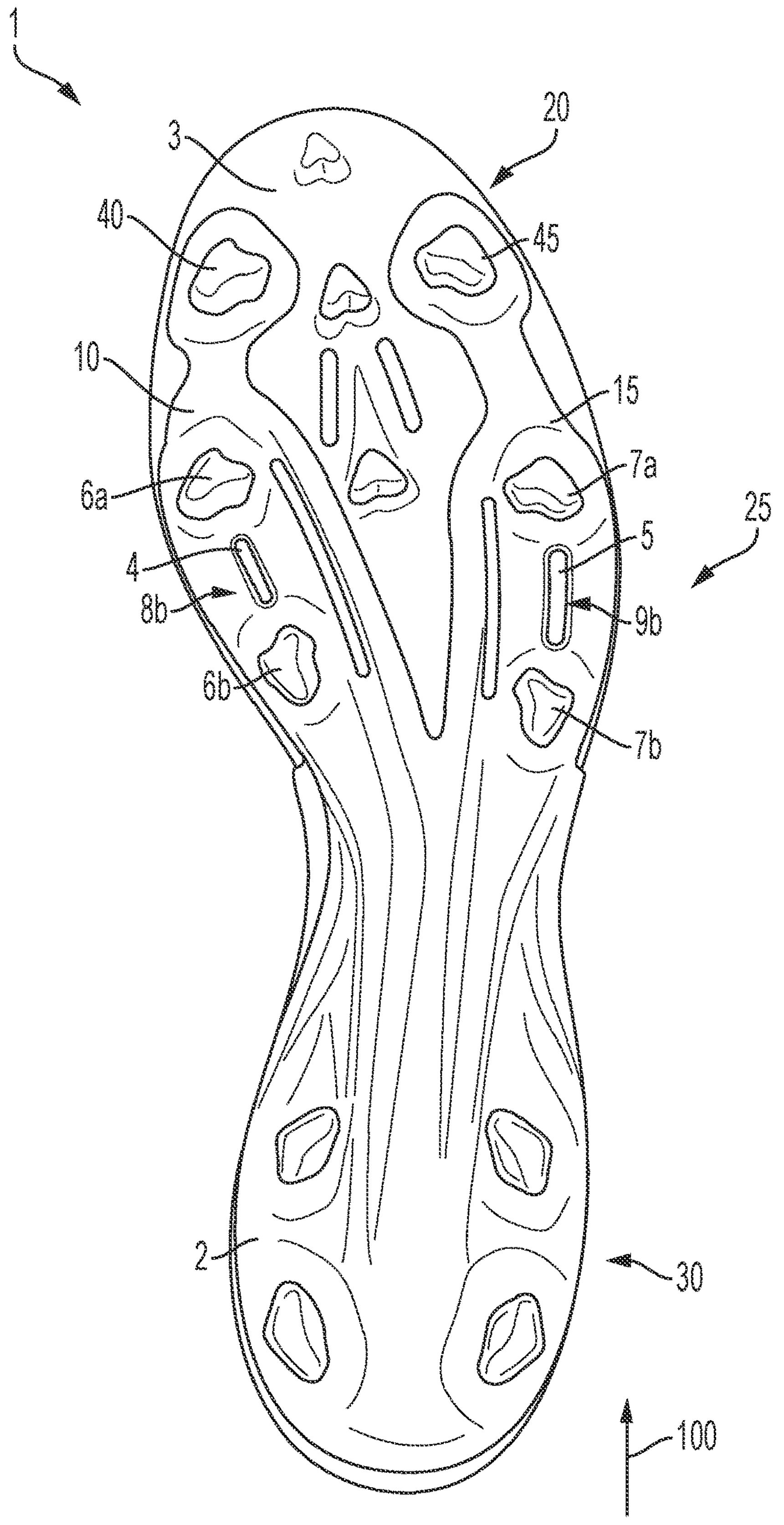
FIG. 2 shows the first exemplary outsole in bottom view.

As can be particularly seen in FIG. 2, the first cushion element 4 and the second cushion element 5 as seen from a heel portion 30 of the outsole 1, as also indicated by arrow 100, do not extend beyond an area of the outsole 1 which is configured to support Metatarsal fat pads. Thereby the first sole segment 2 as seen 100 from the heel portion extends beyond the area of the outsole 1 which is configured to support Metatarsal fat pads in a direction towards the toe portion 20 with a reduced cross-section relative to a cross-section in an area where the first sole segment 2 overlaps with the first cushion element 4 and the second cushion element 5.

Figure 3:
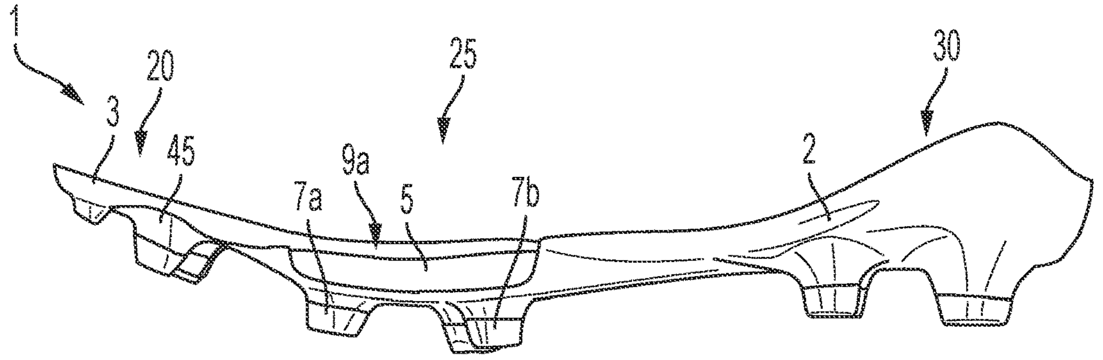
FIG. 3 shows the first exemplary outsole in lateral view.
Figure 4:
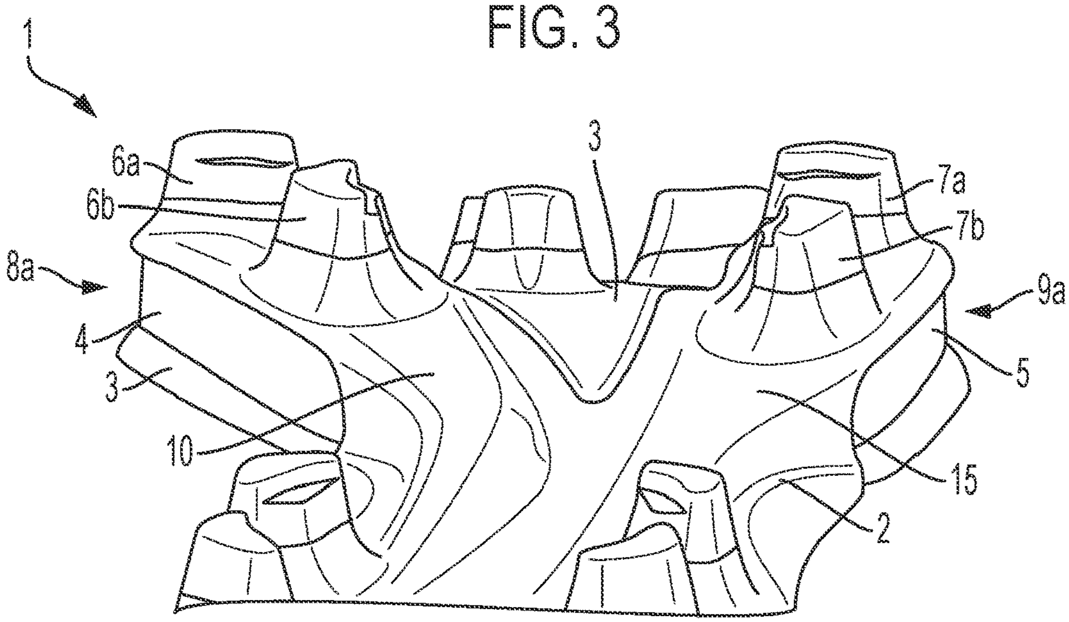
FIG. 4 shows the first exemplary outsole in bottom view where the view is from the heel portion towards the toe portion.

As can be particularly seen from FIG. 3, the first cushion element 4 and the second cushion element 5 are at least partially arranged in the mid-foot portion 25. Thereby the first sole segment 2 and the second sole segment 3 overlap in the mid-foot portion 25. Moreover, the first sole segment 2 and the second sole segment 3 also overlap in the toe portion 20.

The first cushion element 4 and the second cushion element 5 comprise a foam material which may have a strain rate dependent material behaviour. Both cushion elements 4, 5 extend along approximately 25% of a length of the outsole 1. Moreover, a distance between a rearmost point of the outsole 1 and each of the first cushion element 4 and the second cushion element 5 is approximately 50% to 55% of the length of the outsole 1.

All the exemplary outsoles according to embodiments which are depicted in FIGS. 1 to 19 comprise a first sole segment 2 that extends from the heel portion 30 and is branched in a direction to the toe portion 20 of the outsole 1 into at least two branches 10, 15. Thereby each of the two branches 10, 15 at least partially overlaps with the second sole segment 3.

Exemplarily in the embodiment of FIGS. 1 to 4, a first branch 10 comprises the two first studs 6*a*, 6*b* and at least partially houses the first cushion element 4. Moreover, a second branch 15 comprises the two second studs 7*a*, 7*b* and at least partially houses the second cushion element 5. Said first branch 10 extends along the medial part of the outsole 1 and the second branch 15 extends along the lateral part of the outsole 1. Further, said first branch 10 comprises two first apertures 8*a*, 8*b* and the second branch 15 comprises two second apertures 9*a*, 9*b*. A possible arrangement of apertures on branches of the first sole segment 2 is described in more detail regarding FIGS. 16 to 19, below.

As can be further seen in the embodiment of FIGS. 1 to 4, the first branch 10 bridges the first cushion element 4 in a longitudinal direction of the outsole 1 and is attached to the second sole segment 3 at least after bridging the first cushion element 4. Further the second branch 15 bridges the second cushion element 5 in a longitudinal direction of the outsole 1 and is attached to the second sole segment 3 at least after bridging the second cushion element 5. Thereby the first branch 10 terminates in a stud 40 which is attached to the first sole segment 2, and the second branch 15 terminates in a stud 45 which is attached to the first sole segment 2. A cross-section of the first branch 10 is reduced after bridging the first cushion element 4 as seen from the heel portion 30 of the outsole 1. Moreover, a cross-section of the second branch 15 is reduced after bridging the second cushion element 5 as seen from the heel portion 30 of the outsole 1.

Figure 6:
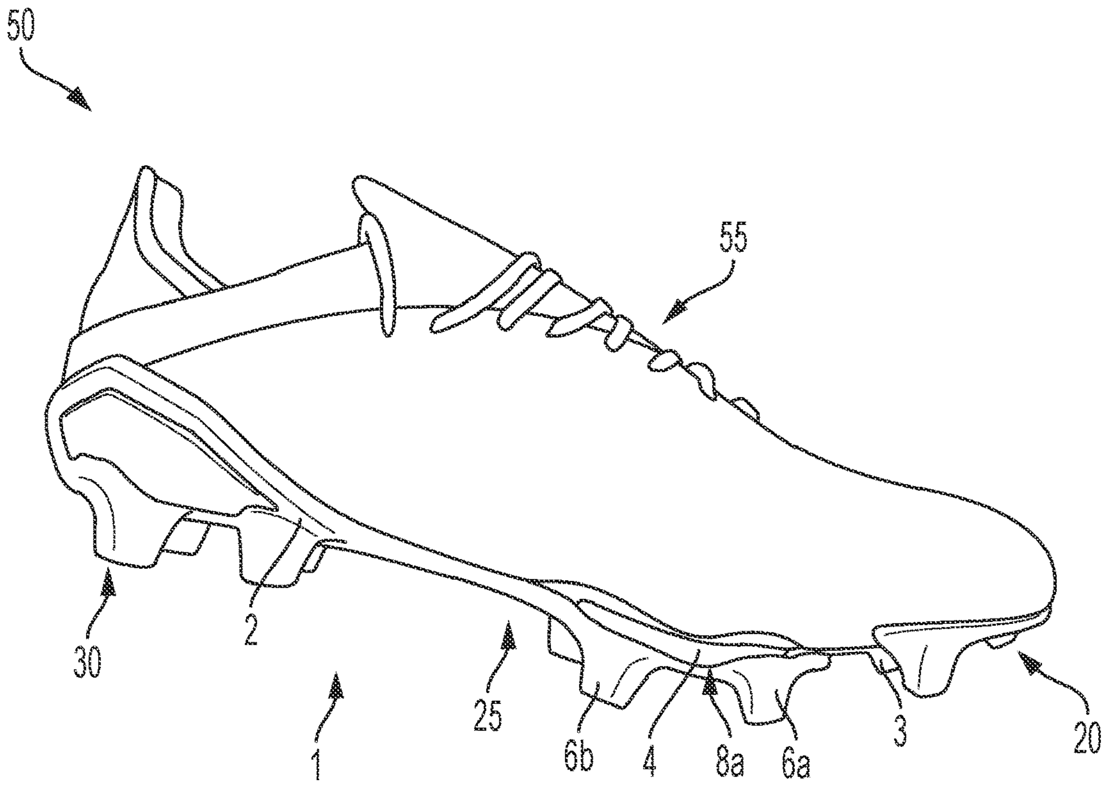
FIG. 6 shows an exemplary shoe in medial view comprising a second exemplary outsole according to some embodiments.
Figure 7:
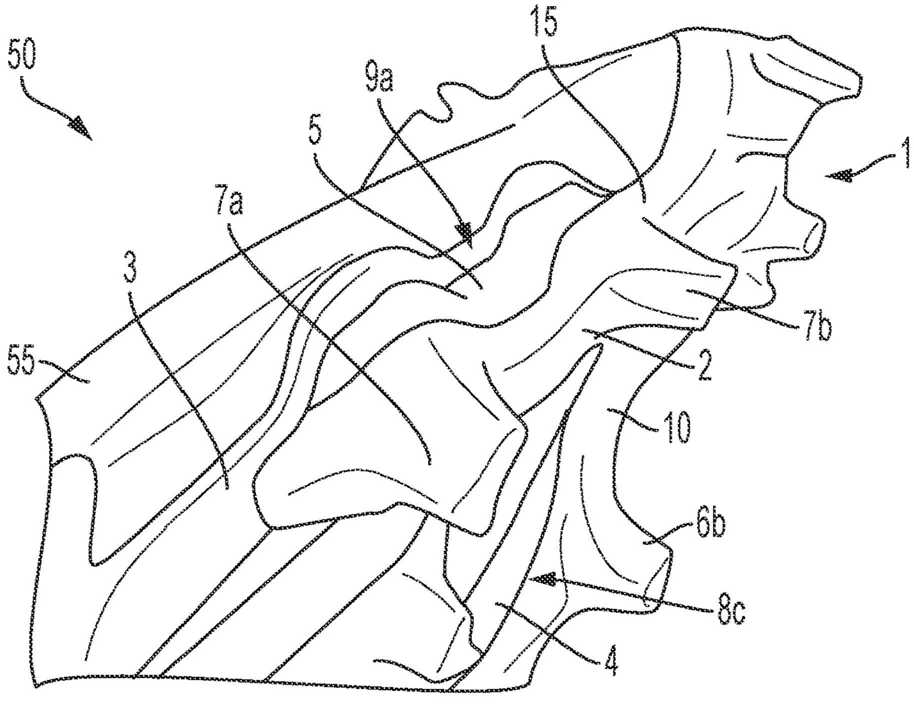
FIG. 7 shows a detail of the exemplary shoe of FIG. 6 in lateral bottom view.

FIG. 6 and FIG. 7 show an exemplary shoe 50 according to some embodiments comprising a second exemplary outsole 1. The shoe 50 further comprises a shoe upper 55. The second exemplary outsole 1 is basically configured as the first exemplary outsole depicted e.g. in FIG. 1. This is particularly understood in view of the equivalent use of reference signs. Accordingly, it is refrained from describing all already above-described features again. However, the outsole depicted in FIG. 6 and FIG. 7 does not comprise bottom apertures 8*b*, 9*b* so as the first exemplary outsole. Further, the first sole segment 2 has a frame like structure. Even further, the first branch 10 comprises a lateral side aperture 8*c* being directed to the lateral part of the outsole 1, such that the first cushion element 4 is exposed towards the second branch 15. Moreover, the first branch 10 comprises a medial side aperture 8*a* such that the first cushion element 4 is exposed medially outward from the outsole 1. Accordingly, the second branch 15 comprises a medial side aperture 9*c* (hidden) directed to the medial part of the outsole 1, such that the second cushion element 5 is exposed towards the first branch 10. Further, the second branch 15 comprises a lateral side aperture 9*a* such that the second cushion element 5 is exposed outward from the outsole 1 in a lateral direction.

Figure 8:
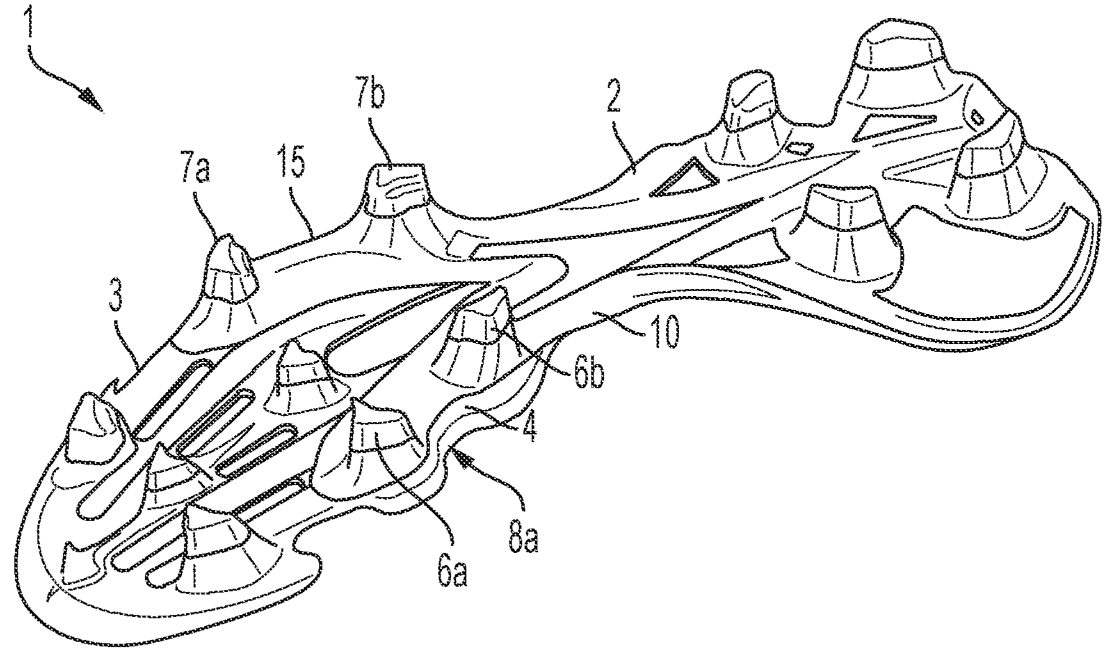
FIG. 8 shows the second exemplary outsole in slightly tilted bottom view with a modification according to some embodiments.
Figure 9:
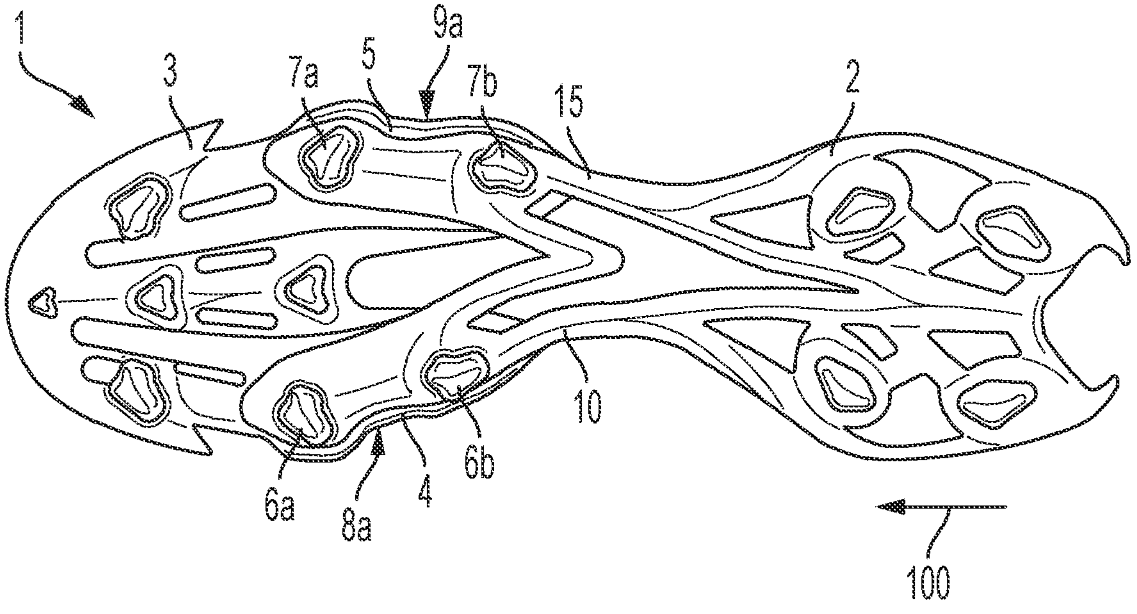
FIG. 9 shows the second exemplary outsole of FIG. 8 in bottom view.

FIG. 8 and FIG. 9 show the second exemplary outsole according to FIGS. 6 and 7 with the modification that the branches 10, 15 do not comprise side apertures 8*c*, 9*c* which face each other.

As can be further seen in the embodiment of the outsole 1 of FIGS. 6 to 9, the first branch 10 bridges the first cushion element 4 in a longitudinal direction of the outsole 1 and is attached to the second sole segment 3 at least before and after bridging the first cushion element 4. Further the second branch 15 bridges the second cushion element 5 in a longitudinal direction of the outsole 1 and is attached to the second sole segment 3 at least before and after bridging the second cushion element 5. Thereby the first branch 10 and the second branch 15 both terminate after bridging the respective cushion element without extending into the toe area 20. Further, the second sole segment 3 as depicted in FIGS. 6 to 9 comprises two additional studs in the forefoot area compared to the embodiments depicted in the previous figures. In the previously depicted embodiments these two studs in the forefoot area are provided on the first sole segment 2 and provided with reference signs 40, 45.

Figure 10:
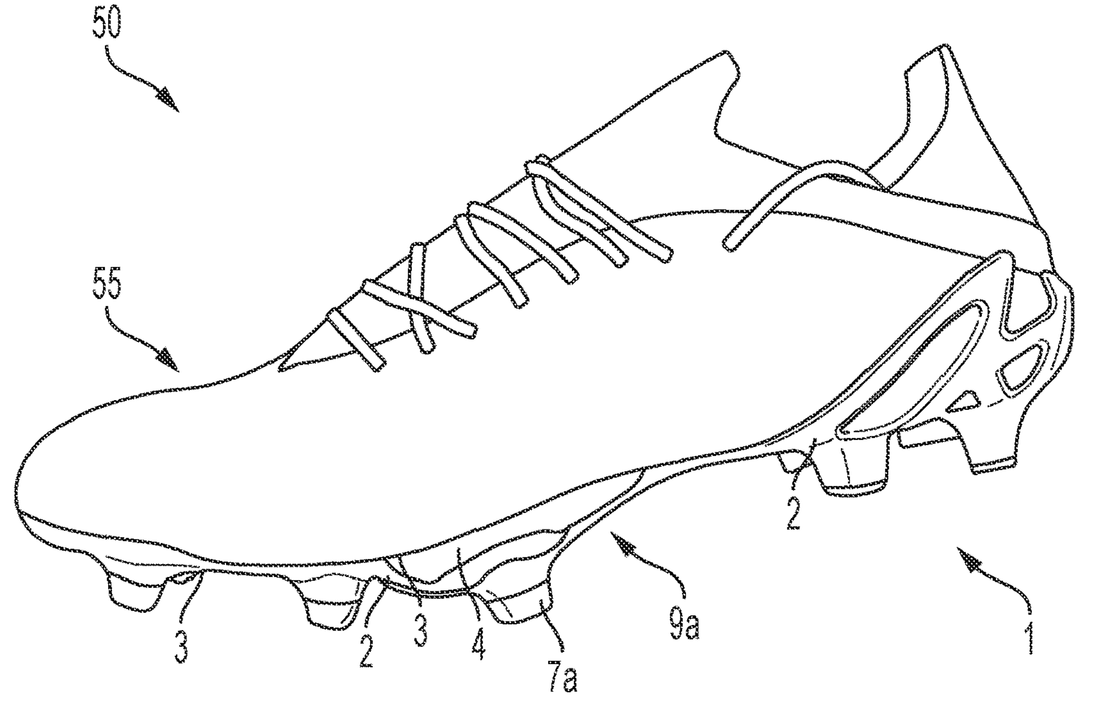
FIG. 10 shows another exemplary shoe in lateral view comprising a third exemplary outsole according to some embodiments.
Figure 11:
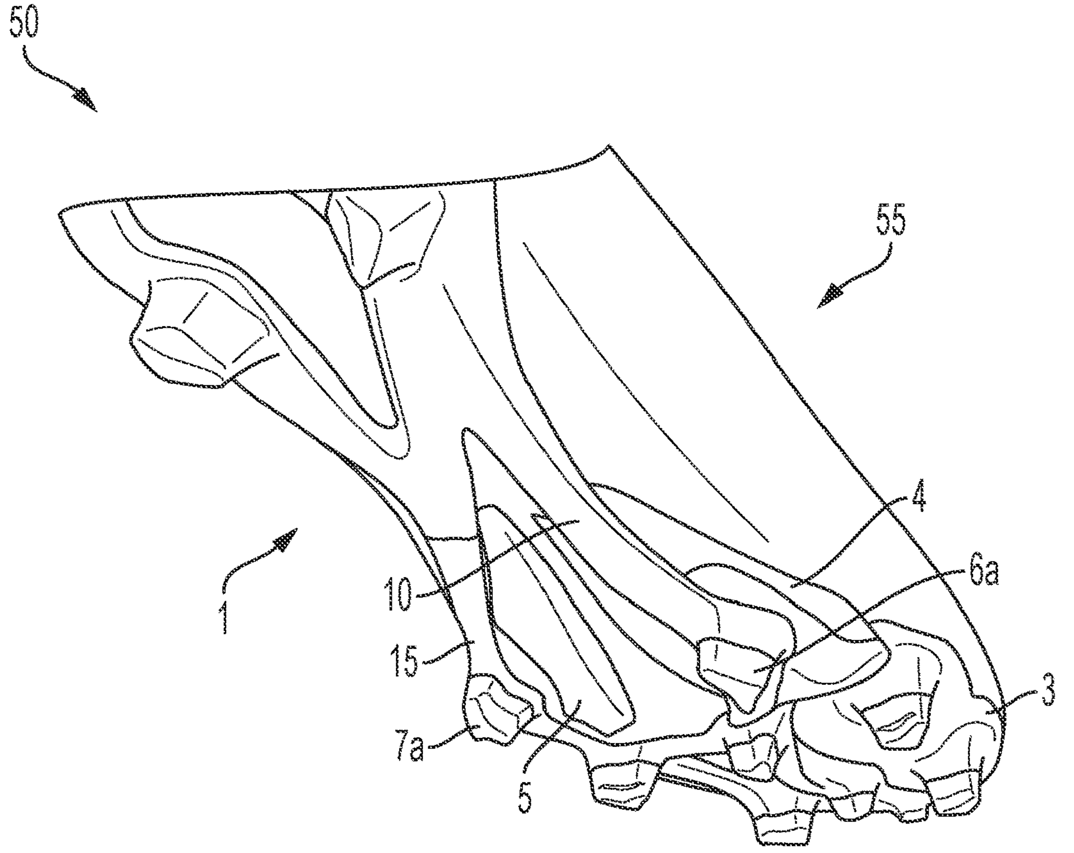
FIG. 11 shows a bottom view of the shoe of FIG. 10.

FIG. 10 and FIG. 11 show another exemplary shoe 50 comprising a third exemplary outsole 1 according to some embodiments. The third exemplary outsole 1 is basically configured as the exemplary outsoles described above. This is particularly understood in view of the equivalent use of reference signs. Accordingly, it is refrained from describing all already above-described features again. However, as shown in FIG. 10, the outsole 1 differs from the previous outsoles therein that the first sole segment 2 and the second sole segment 3 only overlap in a small portion. Primarily, the first cushion element 4 and the second cushion element 5 are arranged directly between the shoe upper 55 and the first sole segment 2. Further, the first cushion element 4 overlaps with only one first stud 6*a*, and the second cushion element 5 overlaps with only one second stud 7*a*.

Figure 12:
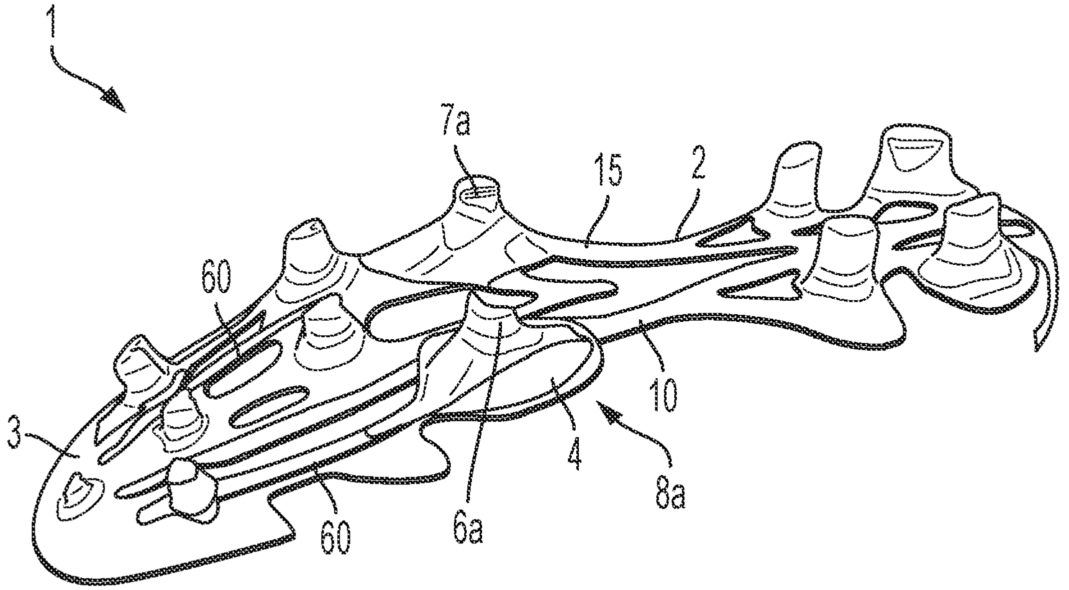
FIG. 12 shows a fourth exemplary outsole according to some embodiments in slightly tilted bottom view.
Figure 13:
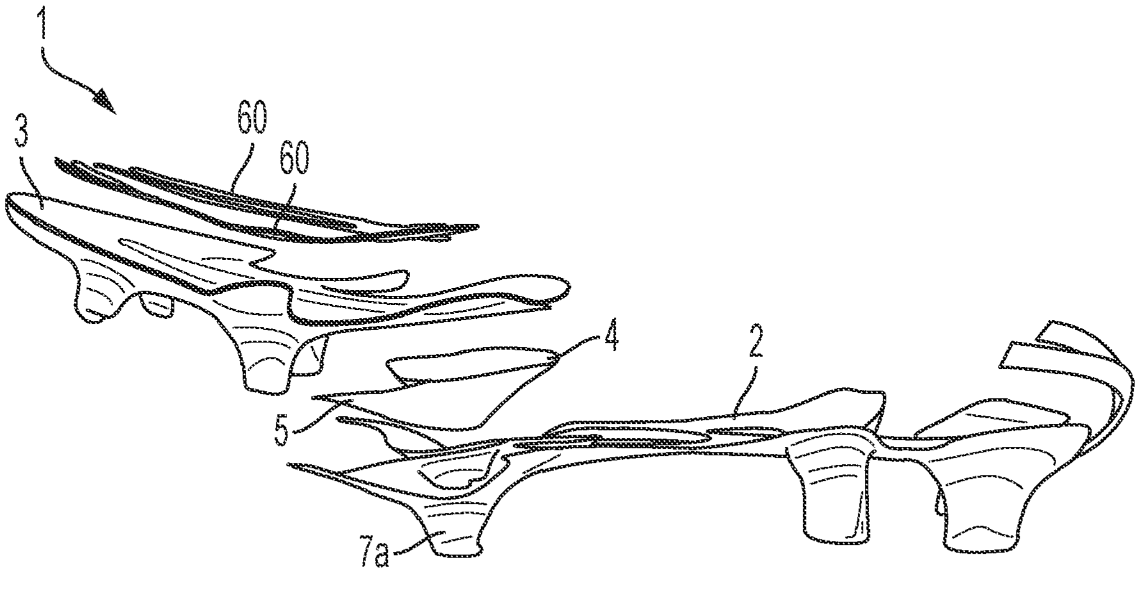
FIG. 13 shows the fourth exemplary outsole laterally in exploded view.

FIG. 12 and FIG. 13 show a fourth exemplary outsole 1 according to some embodiments. The fourth exemplary outsole 1 is basically configured as the exemplary outsoles described above. This is particularly understood in view of the equivalent use of reference signs. Accordingly, it is refrained from describing all already above-described features again. Further, the fourth exemplary outsole 1 comprises reinforcement elements 60 which overlap with the first sole segment 2 and the second sole segment 3. Thereby one of the reinforcement elements 60 overlaps with the first cushion element 4, wherein another one of the reinforcement elements 60 overlaps with the second cushion element 5. The depicted reinforcement elements 60 may comprise hollow material rods, i.e. tubes, and/or full material rods.

Figure 14:
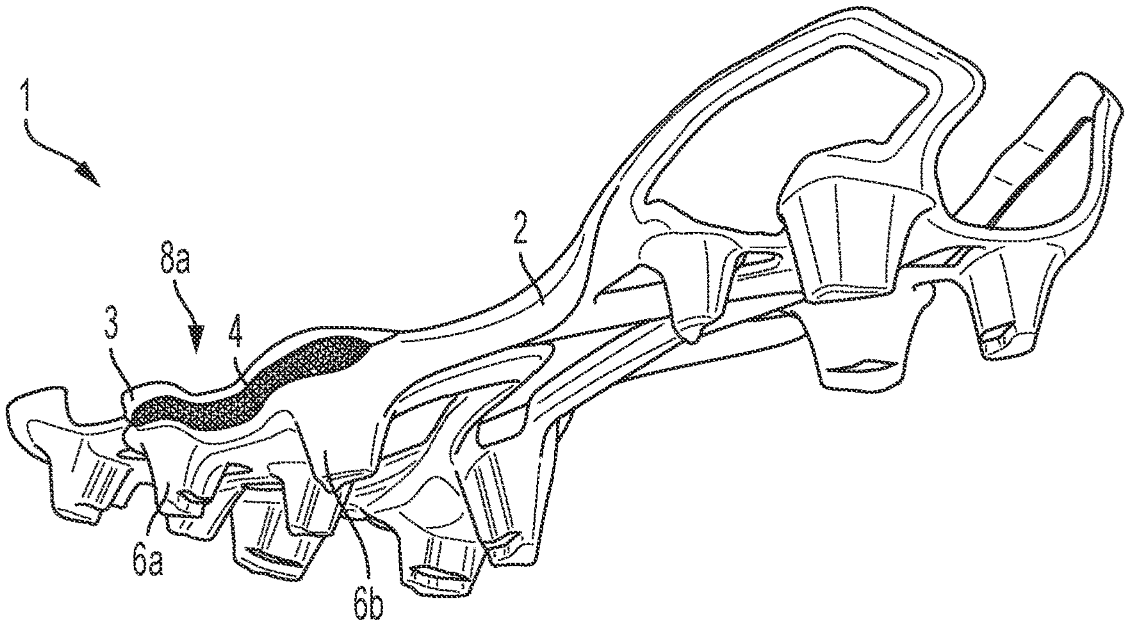
FIG. 14 shows a fifth exemplary outsole according to some embodiments.
Figure 15:
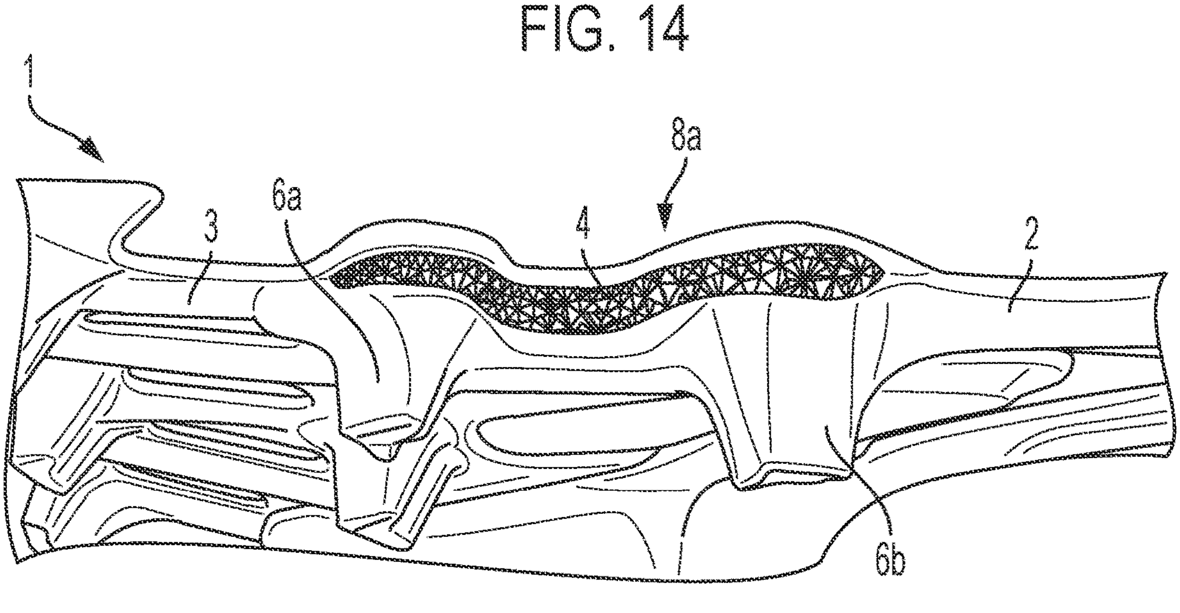
FIG. 15 shows a detail of the fifth exemplary outsole.
Figure 16:
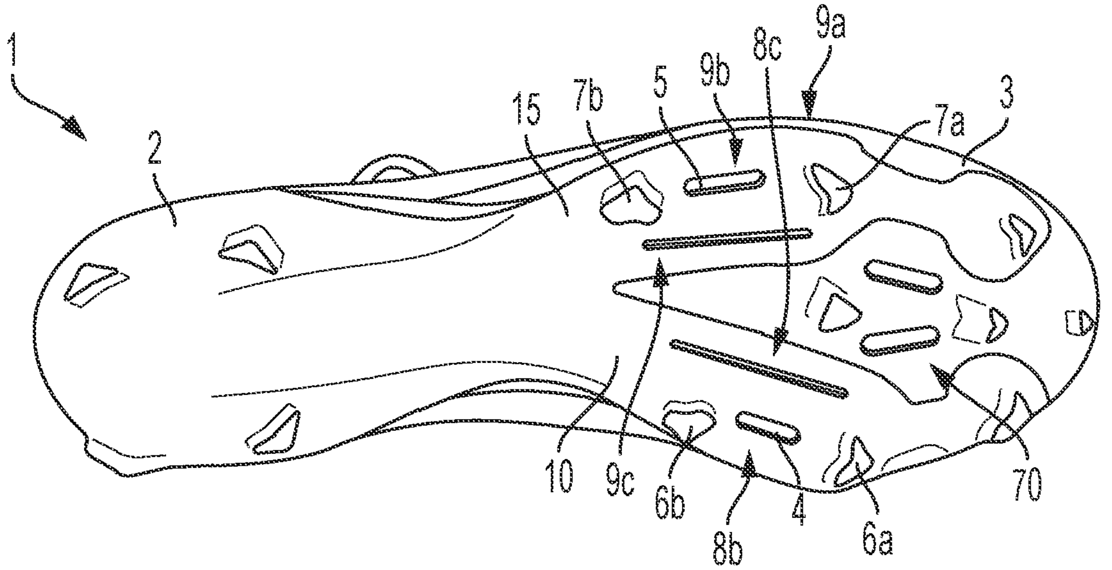
FIG. 16 shows a sixth exemplary outsole according to some embodiments in bottom view.
Figure 17:
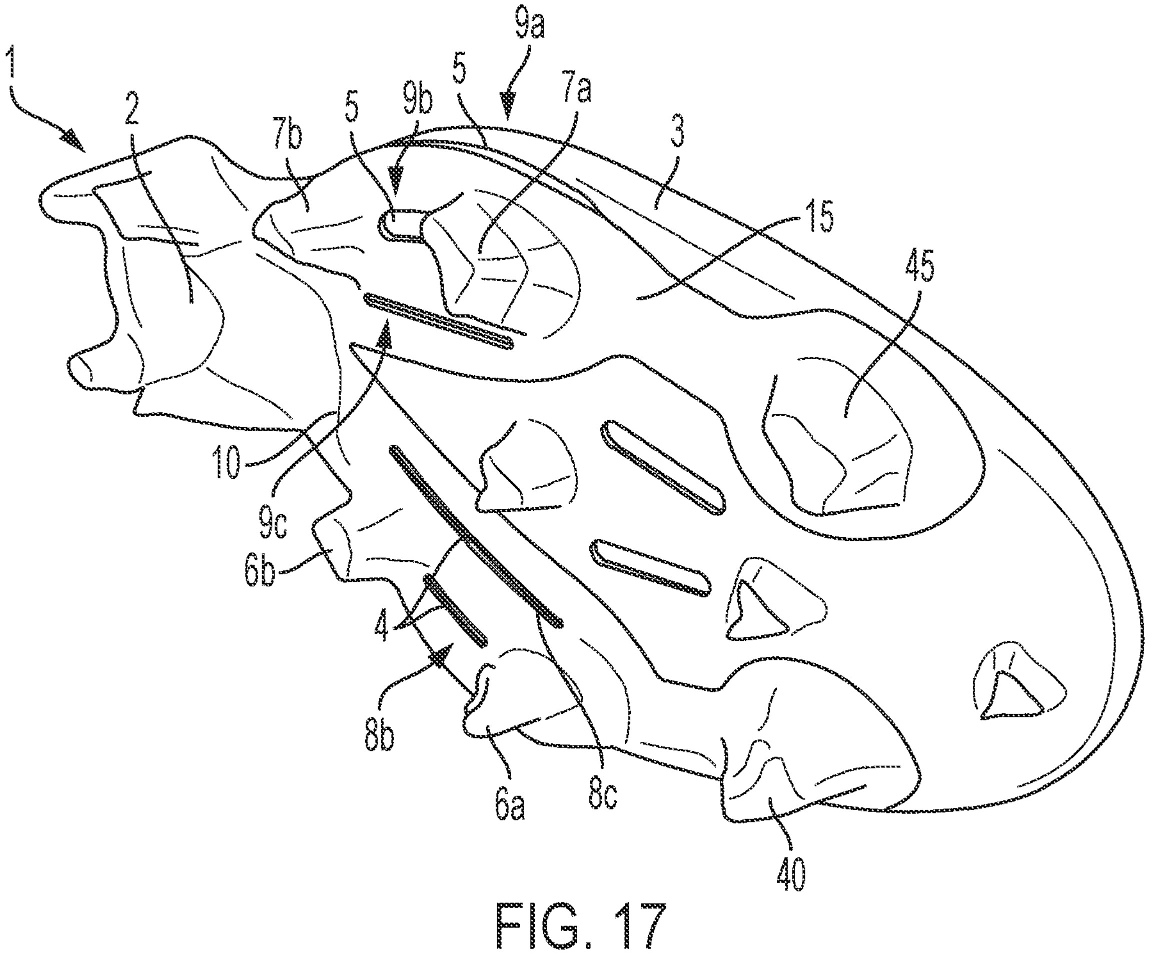
FIG. 17 shows the sixth exemplary outsole in bottom view.

FIG. 14 and FIG. 15 show a fifth exemplary outsole 1 which substantially corresponds to the outsole depicted in FIG. 8 and FIG. 9. However, the fifth exemplary outsole 1 differs from the previous exemplary outsoles therein that the first cushion element 4 and the second cushion element 5 (hidden) comprise a 3D-printed component, namely a 3D-printed lattice structure.

FIGS. 16 to 19 show a sixth exemplary outsole 1 according to some embodiments. The sixth exemplary outsole 1 is basically configured as the exemplary outsole according to FIGS. 1 to 5, as described above. This is particularly understood in view of the equivalent use of reference signs. Accordingly, it is refrained from describing all already above-described features again. Nevertheless, the arrangement of apertures is described in detail with regards to FIGS. 16 to 19 below.

The first branch 10 of the first sole segment 2 comprises three first apertures **8*a*, 8*b*, 8*c*. Thereby the three first apertures 8*a*, 8*b*, 8*c* comprise a lateral side aperture 8*c* being directed to the lateral part of the outsole 1, such that the first cushion element 4 is exposed towards the second branch 15. Moreover, the three first apertures 8*a*, 8*b*, 8*c* comprise a first bottom aperture 8*b* such that the first cushion element 4 is exposed towards a surface on which the outsole 1 is to be placed during normal use. Further, the three first apertures 8*a*, 8*b*, 8*c* comprise a medial side aperture 8*a* such that the first cushion element 4 is exposed medially outward from the outsole 1**.

Furthermore, the second branch 15 comprises three second apertures **9*a*, 9*b*, 9*c*. Thereby the three second apertures 9*a*, 9*b*, 9*c* comprise a medial side aperture 9*c* being directed to the medial part of the outsole 1, such that the second cushion element 5 is exposed towards the first branch 10. Moreover, the three second apertures 9*a*, 9*b*, 9*c* comprise a second bottom aperture 9*b* such that the second cushion element 5 is exposed towards a surface on which the outsole 1 is to be placed during normal use. Further, the three second apertures 9*a*, 9*b*, 9*c* comprise a lateral side aperture 9*a* such that the second cushion element 5 is exposed outward from the outsole 1** in a lateral direction.

Figure 18:
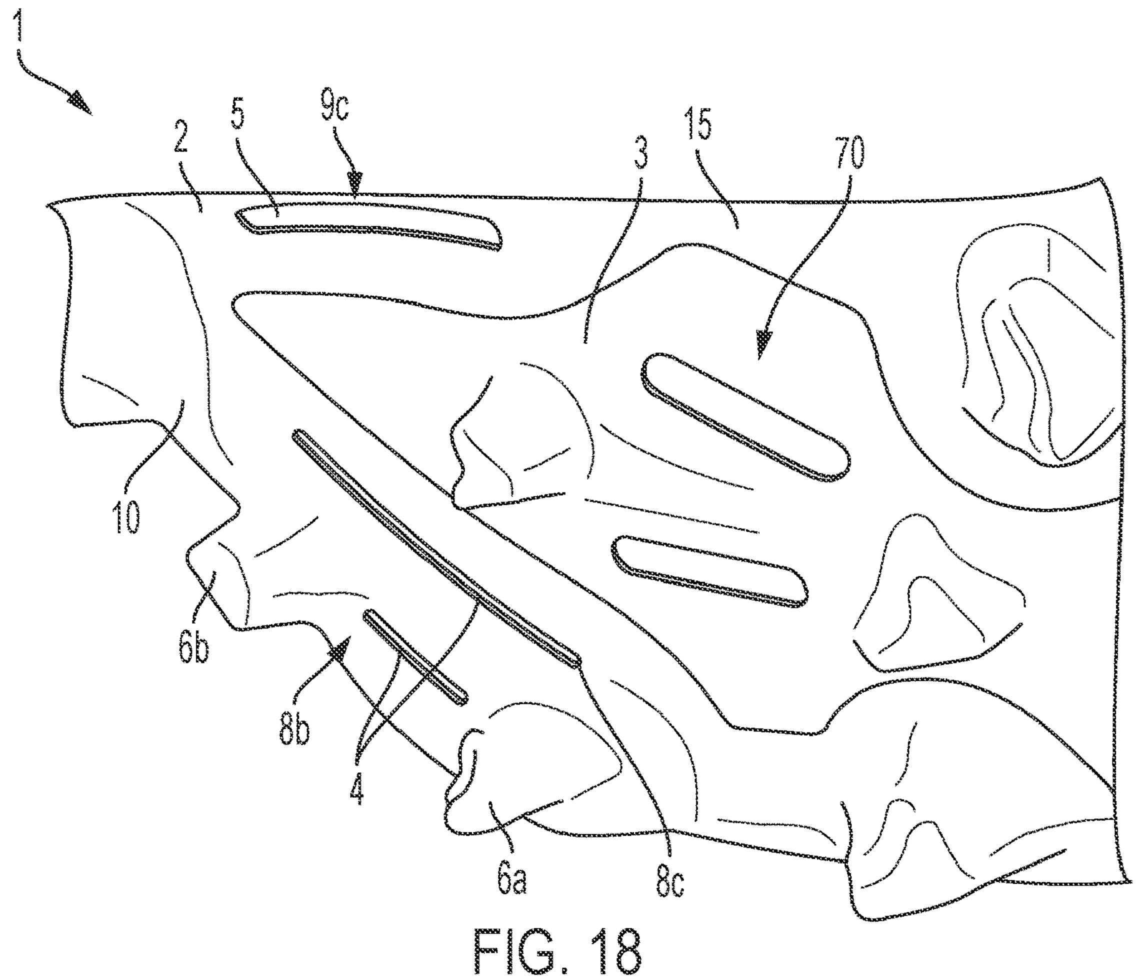
FIG. 18 shows a zoomed-in view of a portion of FIG. 17.
Figure 19:
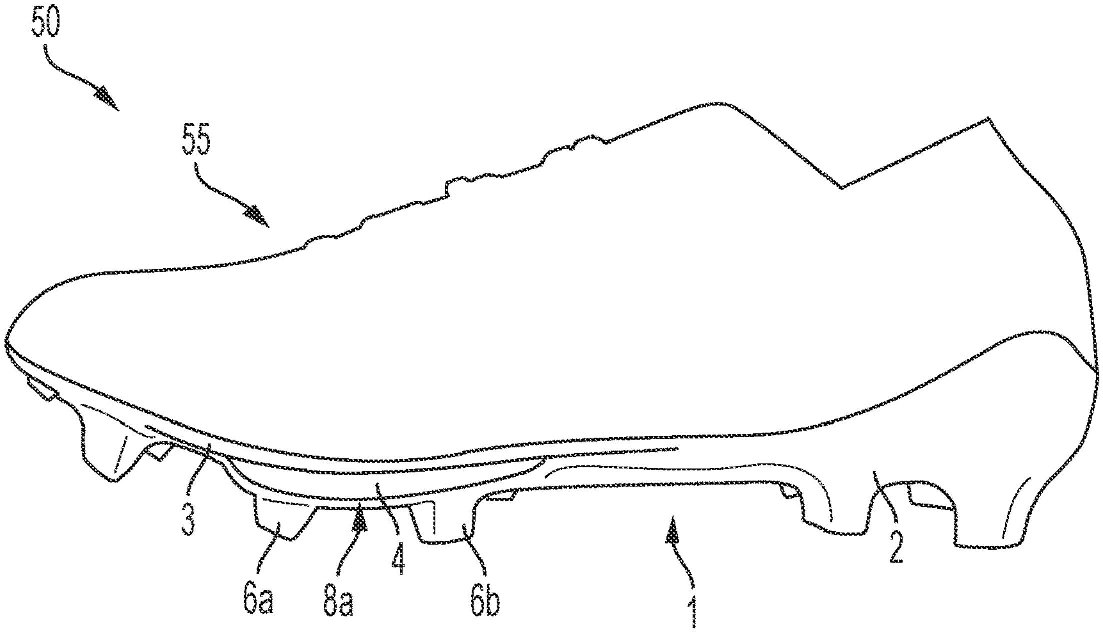
FIG. 19 shows a shoe in medial view comprising the sixth exemplary outsole.

Even further, as exemplarily depicted in FIG. 18, the second sole segment 3 comprises cut-outs 70. These cut-outs 70 may serve to locally decrease the stiffness of the outsole 1. In the fifth exemplary outsole the cut-outs 70 are arranged between the first branch and the second branch 15. However, as e.g. depicted in FIG. 9 this is not necessarily the case.

FIG. 20 to FIG. 24 show a seventh exemplary outsole 1 according to some embodiments. The seventh exemplary outsole 1 is basically configured as the exemplary outsoles described above. This is particularly understood in view of the equivalent use of reference signs. Accordingly, it is refrained from describing all already above-described features again. However, the second sole segment 3 comprises a fixed portion **80*c* which is two-dimensionally connected to the first sole segment 2. Moreover, the second sole segment 3 comprises at least one movable portion 80*a*, Bob which is movable relative to the first sole segment 2 such that a distance between the at least one movable portion 80*a*, Bob and the first sole segment 2** can be changed.

Figure 20:
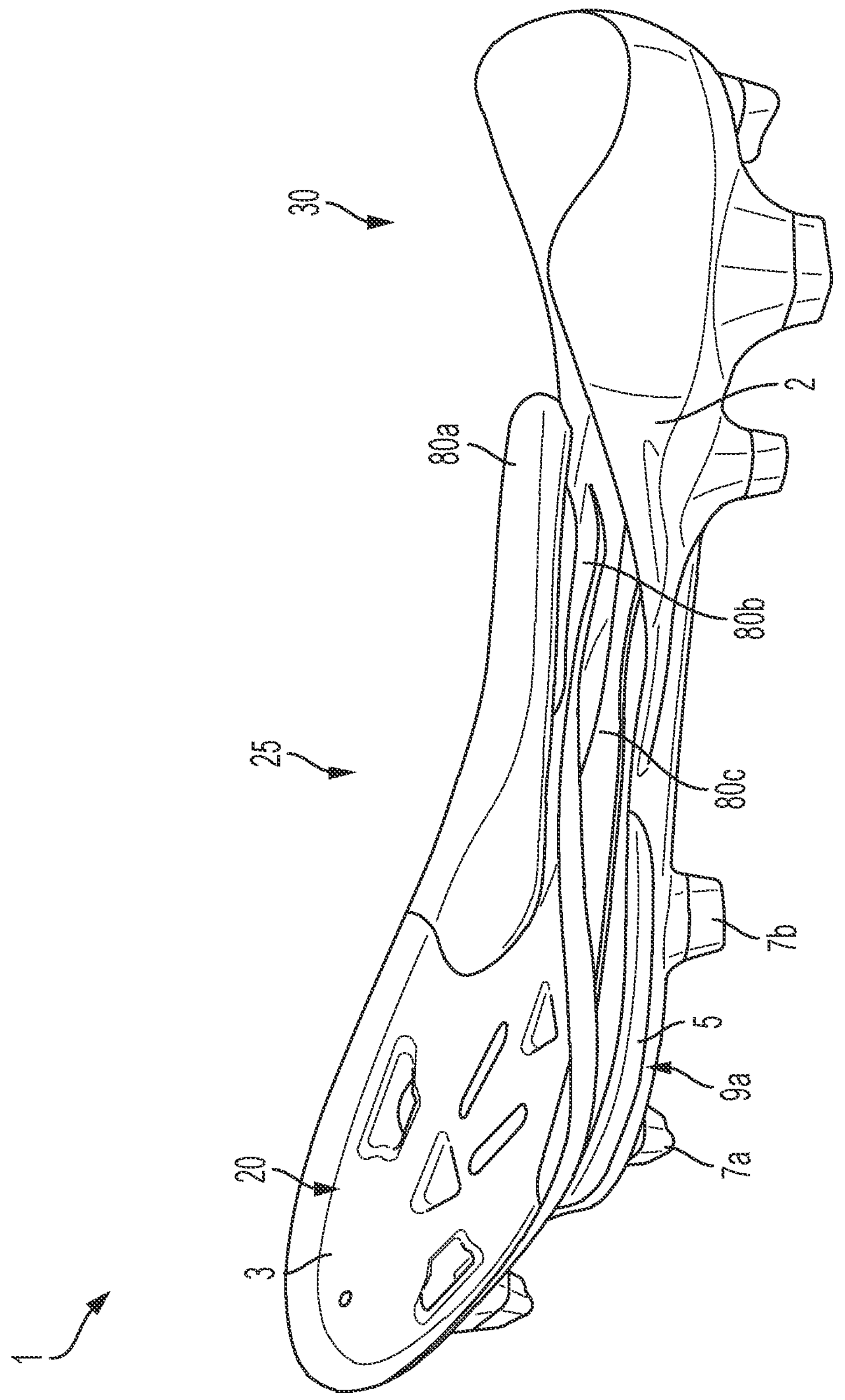
FIG. 20 shows a seventh exemplary outsole according to some embodiments in tilted side view.
Figure 21:
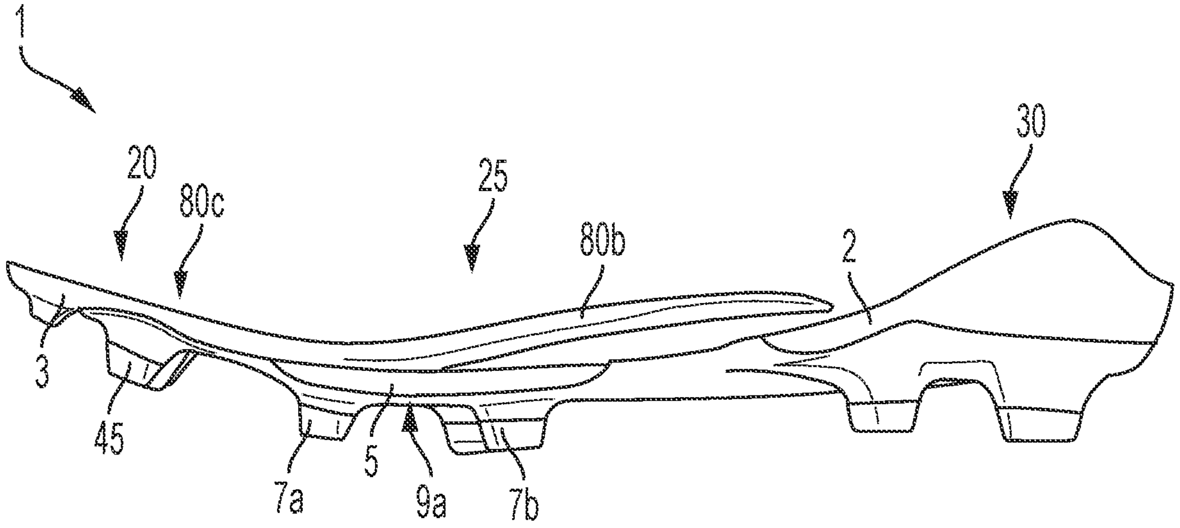
FIG. 21 shows the seventh exemplary outsole in side view.
Figure 23:
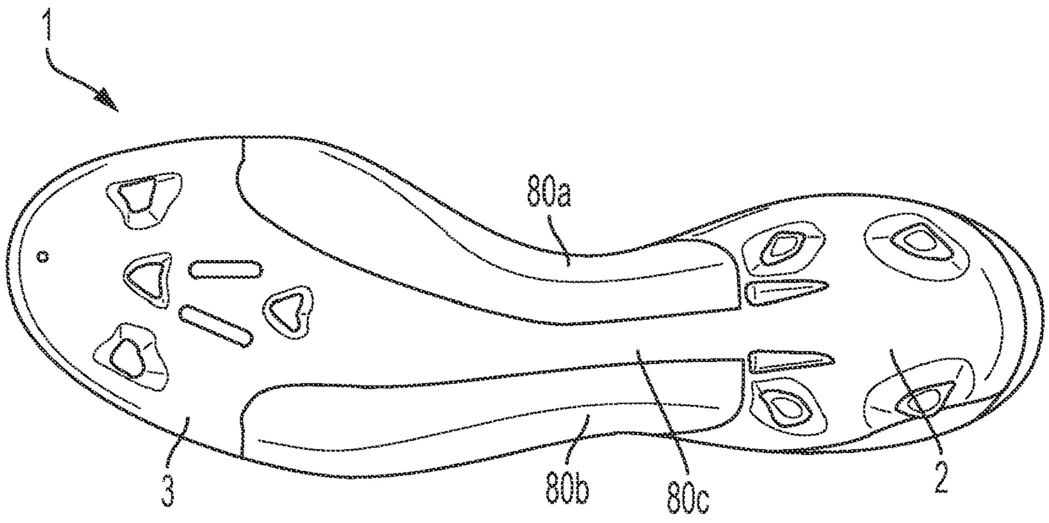
FIG. 23 shows the seventh exemplary outsole in top view.

As illustrated in FIGS. 20, 21 and 23 the at least one movable portion **80*a*, Bob comprises a first movable portion Boa overlapping with the first cushion element, and a second movable portion Bob overlapping with the second cushion element. The fixed portion 80*c* is arranged in a toe portion 20 of the outsole 1 and a mid-foot portion 25 of the outsole 1. The movable portions 80*a*, Bob and the fixed portion 80*c* are each substantially tongue shaped. Further the portions 80*a*, Bob, 80*c* are directed towards the heel portion 30 of the outsole 1. Further, the movable portions 80*a*, Bob each overlap with a branch 10, 15 of the first sole segment 2. The movable portions 80*a*, Bob are integrally formed with the fixed portion 80*c*. For finalizing the manufacturing of the outsole 1, the movable portions 80*a*, Bob may be adhered to the first sole segment 2, the first cushion element 4 and/or the second cushion element 5**.

Figure 24:
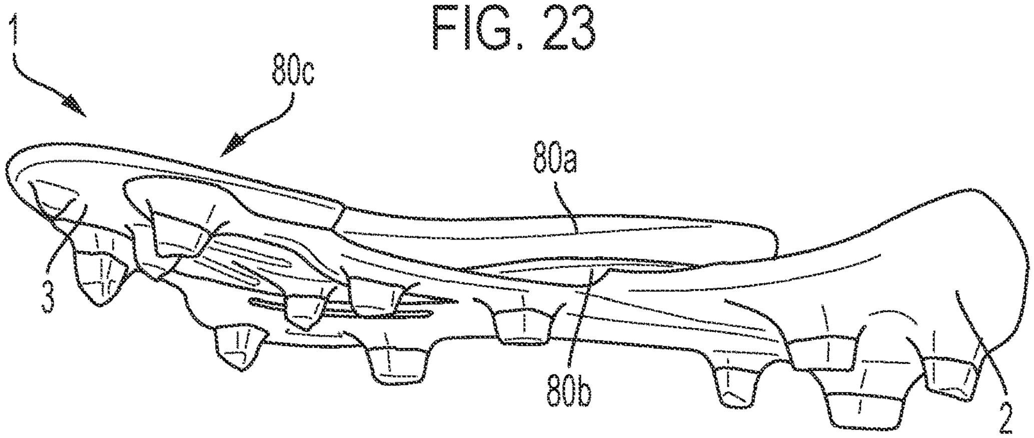
FIG. 24 shows a semi-finished version of the seventh exemplary outsole according to some embodiments in tilted bottom view.
Figure 25:
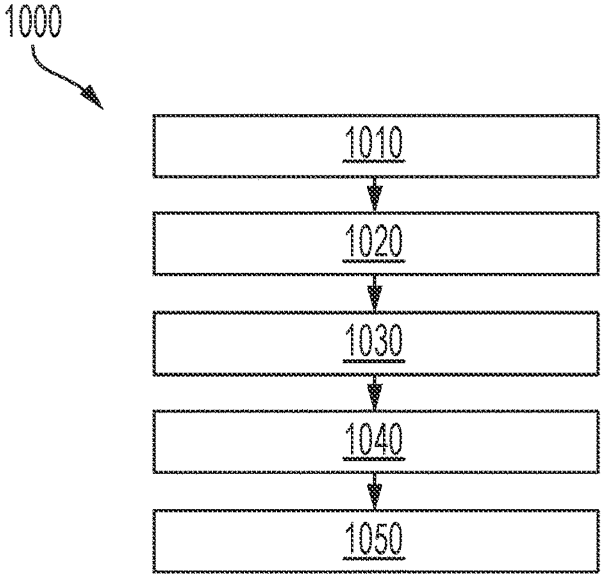
FIG. 25 shows a diagram of an exemplary method for the manufacturing of an outsole according to some embodiments.

FIG. 25 shows a diagram of an exemplary method 1000 for the manufacturing of an outsole 1. The method moo particularly serves for the manufacturing of outsoles as described above. Thereby the outsole 1 of FIGS. 20 to 24 particularly illustrates various aspects of the method woo according to some embodiments. The method woo comprises the following steps:

a) Manufacturing low a first sole segment 2;
b) Placing 1020 a first placeholder onto a medial part of the first sole segment 2 and placing a second placeholder onto a lateral part of the first sole segment 2;
c) Injection moulding 1030 a second sole segment 3, such that the first sole segment 2 and the second sole segment 3 are at least partially connected and such that the first placeholder and the second placeholder are each at least partially located between the first sole segment 2 and the second sole segment 3;
d) Removing 1040 the first placeholder and the second placeholder, and
e) Arranging 1050 a first cushion element 4 and a second cushion element 5 between the first sole segment 2 and the second sole segment 3, wherein the position of the first cushion element 4 at least partially corresponds to the position where the first placeholder was placed, and wherein the position of the second cushion element 5 at least partially corresponds to the position where the second placeholder was placed.

In FIG. 24 the step d) of removing 1040 the first placeholder and the second placeholder has been conducted. However, the step e) has not been conducted yet, as no first cushion element 4 and no second cushion element 5 are arranged between the first sole segment 2 and the second sole segment 3.

As can be seen in FIGS. 20 and 21 said step e) has been conducted. However, the at least one movable portion Boa, Bob of the second sole segment 3 has not yet been adhered to the first sole segment 2, the first cushion element 4 and/or the second cushion element 5.

Figure 26:
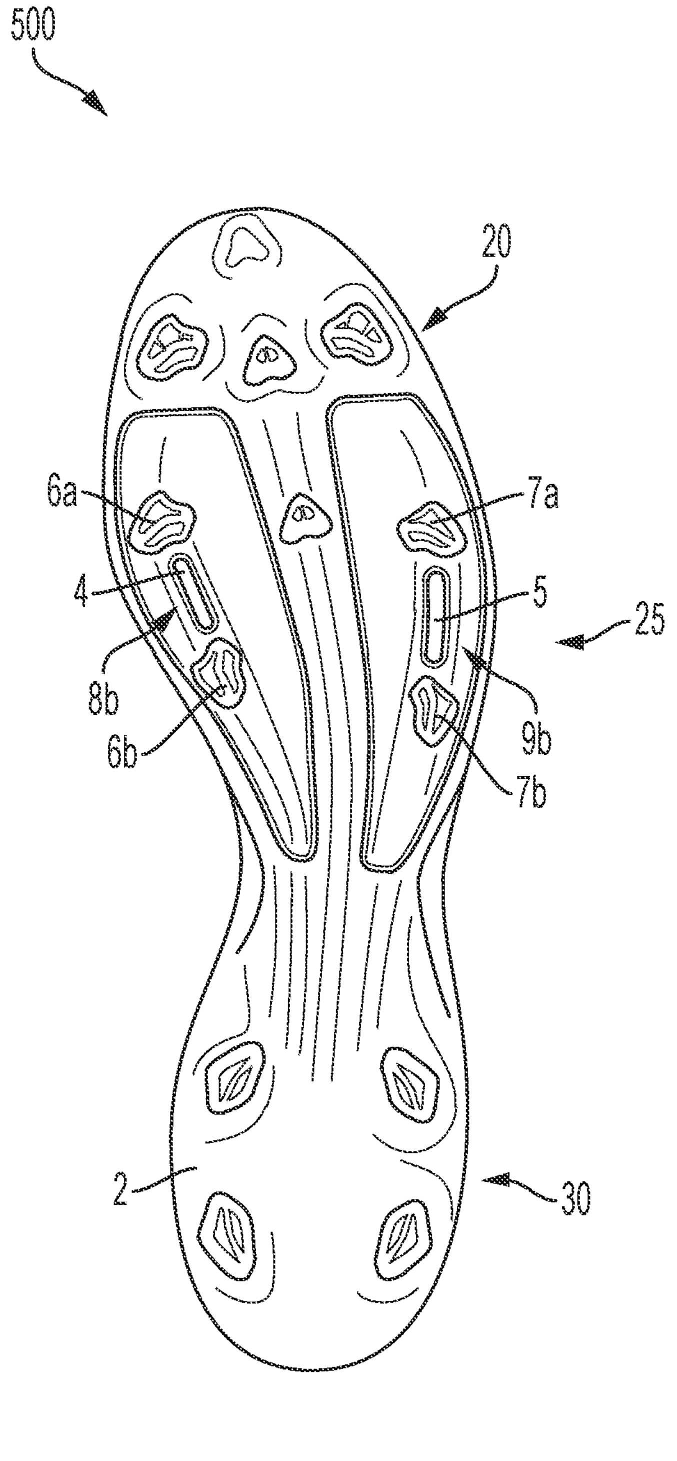
FIG. 26 shows an exemplary outsole according to some embodiments in bottom view.

FIG. 26 shows an outsole 500 according to some embodiments. The outsole 500 is for a shoe, namely a football shoe. The outsole 500 comprises a first sole segment 2 which comprises multiple studs **6*a*, 6*b*, 7*a*, 7*b*. Said first sole segment 2 extends from a toe portion 20 of the outsole 500 to a heel portion 30 of the outsole 500. Further, the outsole 500 comprises a second sole segment (which is hidden). The first sole segment 2 and the (hidden) second sole segment overlap partially. Moreover, the outsole 500 comprises a first cushion element 4 being arranged between the first sole segment 2 and the hidden second sole segment. Said first cushion element 4 overlaps with two first studs 6*a*, 6*b* of the first sole segment 2. Even further, the outsole 500 comprises a second cushion element 5 being arranged between the first sole segment 2 and the hidden second sole segment. Said second cushion element 5 overlaps with two second studs 7***a*, 7*b* of the first sole segment 2. The first studs 6*a*, 6*b* and the second studs 7*a*, 7*b* are attached to the first sole segment 2. The first cushion element 4 is arranged on a medial part of the outsole 1 and the second cushion element 5 is arranged on a lateral part of the outsole 1.

As can be further seen, the first sole segment 2 comprises two apertures 8*b*, 9*b* which overlap at least partially with the first cushion element 4 or the second cushion element 5. Particularly, these two apertures 8*b*, 9*b* are two bottom apertures 8*b*, 9*b*. Thereby a first bottom aperture 8*b* is adapted such that the first cushion element 4 is exposed towards a surface on which the outsole 500 is to be placed during normal use. The first bottom aperture 8*b* extends at least partially between the two first studs 6*a*, 6*b*. A second bottom aperture 9*b* is adapted such that the second cushion element 5 is exposed towards a surface on which the outsole 500 is to be placed during normal use. The second bottom aperture 9*b* extends at least partially between the two second studs 7*a*, 7*b*.

Outsole 500 may be configured as the exemplary outsoles described above. This is particularly understood in view of the equivalent use of reference signs. Accordingly, it is refrained from describing all already above-described features again. Exemplarily, it is understood that the outsole 500 may comprise any one of the apertures 8*a*, 8*b*, 8*c*, 9*a*, 9*b*, 9*c* as described above. Further exemplarily, the cushion elements 4, 5 may be configured as described above.

Figure 27:
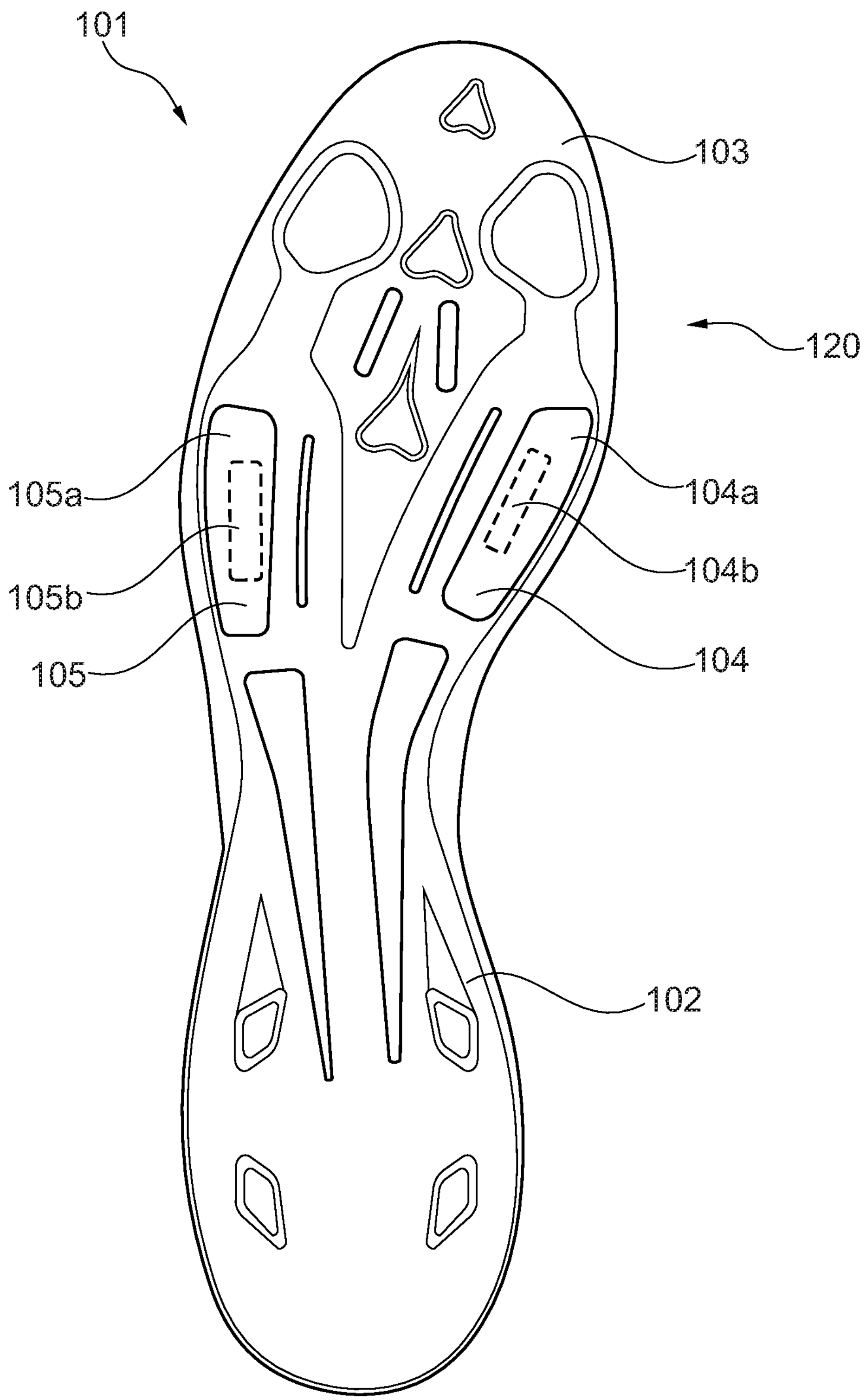
FIG. 27 shows an eighth exemplary outsole according to some embodiments in a top view.
Figure 28:
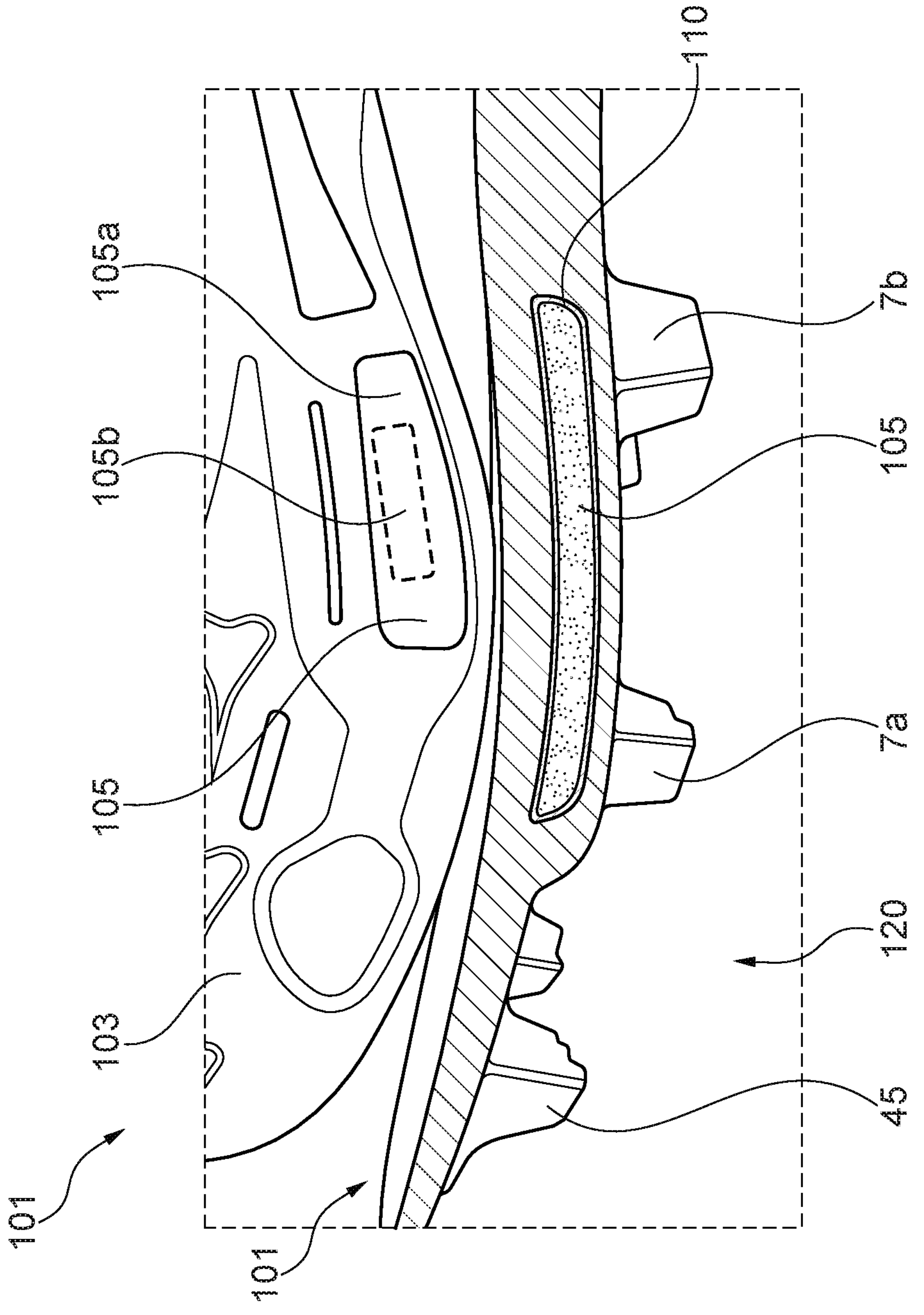
FIG. 28 shows the eighth exemplary outsole in a top view (top portion of the figure) and in a side view (bottom portion of the figure).

FIG. 27 to FIG. 28 show an eighth exemplary outsole 101 according to a further embodiment. This eighth exemplary outsole 101 may be manufactured according to a further method. In some instances, this further method may be referred to as a thirty-sixth embodiment (XXXVI). Though the manufacturing method (XXXVI) of the outsole 101 in FIGS. 27 to 28 may differ from the previous embodiments described elsewhere herein, the outsole 101 may be configured similarly to the ones described elsewhere herein. In particular, the outsole 101 may comprise and combine various features described within the present disclosure. The reference signs of the outsole 1 of other embodiments described herein are increased by 100 (e.g., outsole 1 of other embodiments described herein is referred to as outsole 101 in FIGS. 27 to 28).

The outsole 101 comprises a first sole segment 102 and a second sole segment 103 similarly as described herein. The second sole segment 103 may be arranged in a toe portion 120 of the outsole 101. The outsole 101 may be integrally formed. For instance, the outsole 101 may be provided as an integral sole unit. The outsole 101 has a first cushion element 104 and/or a second cushion element 105, which may be provided substantially within the outsole 101. The first cushion element 104 and/or a second cushion element 105 may be integrally formed with the sole unit. For example, the sole unit, the first cushion element 104, and the second cushion element 105 may be integrally formed using method (XXXVI) or method (XXXVII).

The outsole 101 may comprise a first cavity 104*a* and/or a second cavity 105*a* for housing the first cushion element 104 and/or the second cushion element 105. The first cavity 104*a* may have an opening 104*b* for accessing said first cavity 104*a*. The second cavity 105*a* may also have an opening 105*b* for accessing said second cavity 105*a*. The opening 104*b* and/or the opening 105*b* may be provided on an upper side of the outsole 101, e.g., a side facing an insole of a shoe. As shown in the figures, the opening 104*b* and/or the opening 105*b* can be substantially smaller compared to a largest surface of the respective cavities 104*a*, 104*b*, which facilitates housing the first cushion element 104 and the second cushion element 105, respectively. This is also advantageous from a manufacturing point of view as detailed further below.

As noted above, the outsole 101 may comprise various features of the outsole described elsewhere within the present disclosure. As an example, the first cavity 104*a* and/or the second cavity 105*a* may have apertures 8*a*, 8*b*, 8*c* 9*a*, 9*b*, 9*c* as described elsewhere herein in greater detail.

The method (XXXVI) for the manufacturing of the outsole 101 may comprise one or more method steps described herein in the context of other embodiments. Alternatively or additionally, the method (XXXVI) for the manufacturing of the outsole 101 may comprise particularly the following steps.

a) Manufacturing an integrally formed outsole 101, wherein the outsole 101 comprises a first cavity 104*a* and/or a second cavity 105*a*, each having openings 104*b*, 105*b* for accessing said cavities 104*a*, 105*a*.
b) Placing the outsole 101 in a mould. In some embodiments, the mould may be a pouring mould. In some embodiments, the mould may comprise any features as described elsewhere herein with respect to a mould. In some embodiments, the mould may be opened before placing the outsole 101 in said mould.
c) Applying cushion material, such as foam material, into the first cavity 104*a* and/or second 105*a* cavity. The cushion material may be any suitable cushion material as described herein, for example polyurethane. In some embodiments, applying cushion material comprises pouring and/or injection.
d) Closing, at least partially, the mould, such that the cushioning material and the outsole 101 are at least partially connected (adhered, bonded, or the like) within the first cavity 104*a* and/or the second cavity 105*a* to form the first cushion element 104 and/or the second cushion element 105.

This method (XXXVI) has the advantage that the outsole 101 can be formed integrally and can be easily joined to a shoe upper 55 as described elsewhere herein. In particular, this method (XXXVI) may not require separate sole segments and/or movable parts to be manufactured. In addition, the cushion elements 104, 105 may be connected (adhered, bonded, or the like) directly to the outsole 101. Hence, the method (XXXVI) is rather simplified, straightforward, and demands a lower number of individual steps. In particular, the quality of the outsole 101 can be improved since fewer manual steps are required. As known, manual steps may be prone to errors. Thereby, complexity is reduced, and the method (XXXVI) is more cost-effective. In addition, the sustainability is increased since no adhesive may be necessary. This may further lead to a reduced weight of the outsole 101. A further advantage of the method (XXXVI) is that it allows the provision of various geometries of the outsole 101 and/or parts of the outsole 101. This may be the case since the cavities 104*a*, 105*a* can be filled by the cushioning material in a liquid state.

In yet a further embodiment of the present disclosure, an outsole may be manufactured according to a further method. In some instances, this further method may be referred to as a thirty-seventh embodiment (XXXVII). The method (XXXVII) for the manufacturing of the outsole may comprise one or more method steps described herein in the context of other embodiments. Alternatively or additionally, the method (XXXVII) for the manufacturing of the outsole may comprise particularly the following steps.

a) Placing one or more cushion elements 4, 5, 104, 105 in a mould. The cushion elements 4, 5, 104, 105 may be provided as described elsewhere herein.

b) Injection moulding the first sole segment 2, 102 and/or the second sole segment 3, 103 onto the cushion elements 4, 5, 104, 105, placed in the mould. It is understood that this injection moulding may comprise applying a suitable material (e.g., a polymer or the like as described elsewhere herein) to form the first sole segment 2, 102 and/or the second sole segment 3, 103 onto the cushion elements 4, 5, 104, 105.

b1) This injection moulding step (b) may be performed in a single injection step, such that the first sole segment 2, 102 and/or the second sole segment 3, 103 directly connect (adhere, bond, or the like) to the one or more cushion elements 4, 5, 104, 105.

b2) Alternatively, the first sole segment 2, 102 may be injected onto the cushion elements 4, 5, 104, 105 in a first injection step. Subsequently, the second sole segment 3, 103 may be injected onto the first sole segment 2, 102 and/or onto the cushion elements 4, 5, 104, 105 in a second injection step.

c) Optionally, the cushion elements 4, 5, 104, 105 may comprise a protective layer no, such that an environmental impact and/or any impact during processing/during applying the method (XXXVII) for the manufacturing may be alleviated and/or substantially reduced during the single injection step (b1) and/or the first injection step and second injection step (b2). In one example, the protective layer no may be injected onto the cushion elements 4, 5, 104, 105 in an intermediate step before the single injection step (b1) and/or the first injection step and second injection step (b2). Alternatively, the protective layer 110 may be attached to the cushioning elements 4, 5, 104, 105 with one or more adhesives. Preferably, the protective layer no may be attached to or injected onto the cushion elements 4, 5, 104, 105 at a lower pressure and/or temperature than the pressure and/or temperature during the injection moulding in step (b), step (134), and/or step (b2).

As an alternative to steps a) and b), the method (XXXVII) may comprise the following steps d-g.

d) Injection moulding the first sole segment 2, 102, preferably into a mould, in a first injection step. This injection moulding may comprise applying a suitable material (e.g., a polymer or the like as described elsewhere herein) for the first sole segment 2, 102.

e) Injection moulding one or more cushion elements 4, 5, 104, 105 in a second injection step, such that the one or more cushion elements 4, 5, 104, 105 directly connect (adhere, bond, or the like) to the first sole segment 2, 102.

f) Optionally, injecting one or more protective layers 110 for the cushion elements 4, 5, 104, 105. This may be substantially similar to step c) of method (XXXVII) above. Similar advantages apply here.

g) Injection moulding the second sole segment 3, 103 onto the first sole segment 2, 102, and/or the cushion elements 4, 5, 104, 105 in a third injection step.

In this method (XXXVII), the number of manual assembly steps for manufacturing the outsole can be reduced. Hence, time and effort required for the manufacturing can be decreased. In turn, the method (XXXVII) is more cost-effective. In particular, the method allows that automated injection moulding steps can be performed, which can be monitored and controlled quite easily.

The outsole manufactured according to method (XXXVII) may be configured similarly as the outsole 1, 101, 500 described elsewhere herein. However, in some instances, the structure of the outsole manufactured according to method (XXXVII) may differ from the outsole 1, 101, 500 described elsewhere herein. This may be the case since the protective layer no can become visible, which can give guidance during manufacturing. This may distinguish an outsole manufactured according to method (XXXVII) from outsoles manufactured according to other methods.

In some embodiments, protective layer no can be a film or foil. In some embodiments, protective layer no can comprise a polymeric material. In some embodiments, protective layer no can comprise polyurethane (PU), thermoplastic polyurethane (TPU), polyethylene (PE), polypropylene (PP), or a combination thereof. In some embodiments, protective layer no can wrapped around the entirety of a cushion element 4, 5, 104, 105. In such embodiments, protective layer no can fully encase a cushion element 4, 5, 104, 105.

While various embodiments have been described herein, they have been presented by way of example, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but can be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. An outsole for a shoe, the outsole comprising:

an integrally formed sole unit comprising a first sole segment arranged in at least a mid-foot portion of the outsole and a second sole segment arranged in at least a toe portion of the outsole;

a plurality of studs integrally formed with the sole unit;

a first cavity in the sole unit, wherein the first cavity overlaps with at least one of the plurality of studs;

a second cavity in the sole unit, wherein the second cavity overlaps with at least one of the plurality of studs;

a first cushion element disposed within the first cavity, wherein the first cushion element is integrally formed with the sole unit; and a second cushion element disposed within second cavity, wherein the second cushion element is integrally formed with the sole unit;

wherein the first cavity comprises a first opening formed in an upper surface of the sole unit, wherein the second cavity comprises a second opening formed in the upper surface of the sole unit, and wherein the first opening is smaller than the first cavity and the second opening is smaller than the second cavity.

2. The outsole according to claim 1, wherein the second sole segment is formed over the first cavity and the second cavity.

3. The outsole according to claim 1, wherein the sole unit comprises at least one aperture that overlaps at least partially with the first cushion element or the second cushion element.

4. The outsole according to claim 3, wherein the at least one aperture comprises at least one bottom aperture which is adapted such that the first cushion element and/or the second cushion element is exposed towards a surface on which the outsole is to be placed during normal use.

5. The outsole according to claim 3, wherein the at least one aperture comprises at least one side aperture which is adapted such that the first cushion element and/or the second cushion element is exposed in a lateral direction of the outsole or a medial direction of the outsole.

6. The outsole according to claim 3, wherein the at least one aperture comprises a first aperture that overlaps at least partially with the first cushion element.

7. The outsole according to claim 6, wherein the at least one aperture comprises a second aperture that overlaps at least partially with the second cushion element.

8. The outsole according to claim 1, wherein the first cavity overlaps with at least two of the plurality of studs on a lateral side or a medial side of the outsole.

9. The outsole according to claim 1, wherein the first cavity overlaps with at least two of the plurality of studs on a lateral side of the outsole, and wherein the second cavity overlaps with at least two of the plurality of studs on a medial side of the outsole.

10. The outsole according to claim 1, wherein the first cushion element and/or the second cushion element comprise a foam material.

11. The outsole according to claim 1, wherein the first sole segment is branched in a direction towards the toe portion of the outsole into at least two branches, wherein a first branch comprises at least one of the plurality of studs, and wherein a second branch comprises at least one of the plurality of studs.

12. The outsole according to claim 11, wherein the first branch comprises at least two of the plurality of studs on a lateral side of the outsole and wherein the second branch comprises at least two of the plurality of studs on a medial side of the outsole.

13. The outsole according to claim 1, wherein the first cushion element comprises a first compressibility characterized by a first change in height when a force is applied to the first cushion element in a vertical direction, the second cushion element comprises a second compressibility characterized by a second change in height when the force is applied to the second cushion element in the vertical direction, and the second change of height is less than the first change of height.

14. A shoe comprising a shoe upper and an outsole according to claim 1.

15. A method for the manufacturing of an outsole according to claim 1, the method comprising:

placing the sole unit in a mould;

applying the first cushion element into the first cavity;

applying the second cushion element into the second cavity;

closing the mould to integrally form the first cushion element and the second cushion element with the sole unit.

16. The method according to claim 15, wherein applying the first cushion element into the first cavity comprises pouring or injecting cushioning material into the first cavity, and wherein applying the second cushion element into the second cavity comprises pouring or injecting cushioning material into the second cavity.

17. A method for the manufacturing of an outsole according to claim 1, the method comprising:

placing the first cushion element and the second cushion element within a mould;

injection moulding the sole unit onto the first cushion element and the second cushion element within the mould.

18. The method according to claim 17, injection moulding the sole unit comprises injection moulding the first sole segment in a first injection moulding step and injection moulding the second sole segment in a second injection moulding step.

19. The method according to claim 17, wherein placing the first cushion element and the second cushion element within a mould comprises injection moulding the first cushion element and the second cushion element, and the method comprises:

injection moulding the first sole segment into the mould;

injection moulding the first cushion element and the second cushion element onto the first sole segment; and injection moulding the second sole segment onto the first sole segment, the first cushion element, and the second cushion element.

* * * * *